United States Patent
Noh et al.

(10) Patent No.: US 10,091,736 B2
(45) Date of Patent: Oct. 2, 2018

(54) METHOD OF CONTROLLING UPLINK SIGNAL TRANSMISSION POWER AND APPARATUS THEREOF

(71) Applicant: KT CORPORATION, Gyeonggi-do (KR)

(72) Inventors: Min Seok Noh, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/687,865

(22) Filed: Apr. 15, 2015

(65) Prior Publication Data

US 2015/0304957 A1    Oct. 22, 2015

(30) Foreign Application Priority Data

Apr. 18, 2014 (KR) .................. 10-2014-0046986
Feb. 11, 2015 (KR) .................. 10-2015-0021154

(51) Int. Cl.
*H04B 7/00* (2006.01)
*H04W 52/14* (2009.01)
(Continued)

(52) U.S. Cl.
CPC ......... *H04W 52/146* (2013.01); *H04W 52/34* (2013.01); *H04W 52/367* (2013.01)

(58) Field of Classification Search
CPC ............. H04W 52/146; H04W 52/325; H04W 52/367; H04W 72/0413; H04W 72/0426
(Continued)

(56) References Cited

U.S. PATENT DOCUMENTS

2012/0113827 A1    5/2012  Yamada et al.
2013/0208710 A1*   8/2013  Seo .................. H04L 1/0026
                                                            370/336

(Continued)

FOREIGN PATENT DOCUMENTS

CN    103190100 A    7/2013
CN    103200662 A    7/2013

OTHER PUBLICATIONS

State Intellectual Property Office of the P.R.C, Office Action of corresponding CN Patent Application No. 201510188805.8, dated Dec. 29, 2017.

*Primary Examiner* — Tu X Nguyen
(74) *Attorney, Agent, or Firm* — IP Legal Services, LLC

(57) ABSTRACT

The present disclosure relates to a method and an apparatus for allocating or controlling transmission power when a User Equipment (UE) transmits uplink signals. More particularly, the present disclosure relates to a method and an apparatus capable of multiplexing uplink channels or signals from identical base station (e.g., eNB) or between different base stations when the UE transmits various kinds of channels or signals to an uplink in a dual connectivity environment for transmission to or reception from different base stations. The present disclosure provides a method of controlling uplink transmission power by an UE. The method may include determining a maximum uplink transmission power with respect to each cell group of multiple cell groups each including at least one of serving cells, and transmitting uplink channels and uplink signals of each of the multiple cell groups using a maximum uplink transmission power of each one of the multiple cell groups.

16 Claims, 26 Drawing Sheets

(51) Int. Cl.
*H04W 52/34* (2009.01)
*H04W 52/36* (2009.01)

(58) Field of Classification Search
USPC .................................. 455/69, 522, 448, 450
See application file for complete search history.

(56) References Cited

U.S. PATENT DOCUMENTS

| | | |
|---|---|---|
| 2013/0223392 A1 | 8/2013 | Seo et al. |
| 2014/0050205 A1* | 2/2014 | Ahn .................... H04W 52/146 370/336 |
| 2014/0162609 A1* | 6/2014 | Chien ................... H04W 4/043 455/414.1 |
| 2014/0219153 A1 | 8/2014 | Seo et al. |
| 2014/0321392 A1 | 10/2014 | Li |
| 2015/0245356 A1 | 8/2015 | Seo et al. |
| 2015/0358915 A1* | 12/2015 | Semaan .............. H04W 52/146 370/329 |
| 2016/0157190 A1 | 6/2016 | Seo et al. |

* cited by examiner

- —— BACKHAUL LINK WITHIN CLUSTER
- ----- BACKHAUL LINK BETWEEN SMALL CELL AND MACRO CELL

X : cc0 WHEN SeNB INDEX IS INDEPENDENT AND cc2 WHEN THE SeNB INDEX IS CONNECTED

METHOD OF CONTROLLING UPLINK SIGNAL TRANSMISSION POWER AND APPARATUS THEREOF

CROSS-REFERENCE TO RELATED APPLICATION

This application claims priority under 35 U.S.C. § 119(a) to Korean Application Serial Nos. 10-2014-0046986 & 10-2015-0021154, which were filed in the Korean Intellectual Property Office on Apr. 18, 2014 & Feb. 11, 2015, the entire content of which is hereby incorporated by reference.

BACKGROUND OF THE INVENTION

1. Field of the Invention

The present disclosure relates to a method and an apparatus for allocating or controlling transmission power when a User Equipment (UE) transmits uplink channels and signals. More particularly, the present disclosure relates to a method and an apparatus of multiplexing uplink channels or signals transmitted to the same base station (e.g., eNB) or to different base stations (e.g., eNBs), when the UE transmits various kinds of channels or signals through an uplink in a dual connectivity environment where signals are transmitted to or received from different base stations.

2. Description of the Prior Art

As communication systems have advanced, various types of wireless terminals have been introduced to consumers, such as companies and individuals. Current mobile communication systems have been affiliated with $3^{rd}$ generation partnership projection (3GPP) technologies, for example, Long Term Evolution (LTE), LTE-Advanced (LTE-A), and the like. Such mobile communication systems are capable of transmitting and receiving a large amount of various type data (e.g., voice data, image data, and radio data) at a high speed. Accordingly, there is a demand for developing a technology for transmitting such a large amount of data as fast as a transmit rate in a wired communication network. In order to transmit such a massive amount of data, a plurality of cells may be used to transmit data.

Lately, there are many studies in progress for developing technology for utilizing small sized base stations (e.g., eNB) having relatively narrow service coverage such as a small cell in order to transmit a large amount of data at a high speed, and to stably transmit and receive data in an environment having a plurality of terminals densely located in a service area of a specific base station (e.g., eNB).

Further, there are also many studies in progress for dual connectivity that performing communication with a UE using a small cell and a typical macro cell. In such dual connectivity environment, the UE may perform wireless communication with multiple base stations (e.g., eNBs).

However, there has never been any discussion on how to distribute limited transmission power of a user equipment to a plurality of base stations in such a dual connectivity environment and what standard to be used to distribute transmission power to various type of simultaneously transmitted signals. Accordingly, there is a problem in that a UE processes high capacity data at a high speed using multiple base stations (e.g., eNBs). That is, a UE cannot transmit an uplink signal using dual connectivity without deciding how a UE distributes transmission power to each signal and what reference to be used for the UE to distribute the transmission power.

SUMMARY OF THE INVENTION

In a situation as described above, the present disclosure proposes a method and an apparatus for controlling uplink transmission power to enable a UE to transmit an uplink channel or signal in a dual connectivity environment.

Further, the present disclosure proposes a method and an apparatus for allocating transmission power to each signal for enabling a UE to simultaneously transmit an uplink channel and signal in a dual connectivity environment.

Further, the present disclosure proposes a method and an apparatus for configuring a transmission indicator for simultaneous transmission of a channel and a signal by each cell group in order to enable a UE to simultaneously transmit an uplink channel and signal in a dual connectivity environment.

In accordance with an aspect of the present disclosure, there is provided a method of controlling an uplink transmission power of a UE by a base station (e.g., eNB). The method includes: configuring dual connectivity in an UE; determining a maximum uplink transmission power with respect to each of multiple cell groups each including at least one of serving cells; and indicating a maximum transmission power for the each cell group to the UE.

In accordance with another aspect of the present disclosure, there is provided a method of controlling an uplink transmission power by an UE. The method includes: determining an maximum uplink transmission power with respect to multiple cell groups each including at least one of serving cells; and transmitting uplink channels and uplink signals for each of the multiple cell groups using the maximum uplink transmission power of each of the multiple cell groups.

In accordance with another aspect of the present disclosure, there is provided a method of receiving uplink channels and uplink signals by a base station (e.g., eNB). The method includes: configuring dual connectivity in a UE; and receiving uplink channels and uplink signals from the base station, wherein the uplink channels and the uplink signals are transmitted based on a maximum uplink transmission power for a cell group including one or more cells provided by the base station.

In accordance with another aspect of the present disclosure, there is provided a user equipment (UE) for controlling an uplink transmission power. The UE includes: a controller and a transmitter. The controller may be configured to determine a maximum uplink transmission power with respect to each of multiple cell groups including one or more serving cells. The transmitter may be configured to transmit uplink channels and uplink signals for each of the multiple cell groups using the maximum uplink transmission power of each of the multiple cell groups.

In accordance with another aspect of the present invention, there is provided a base station (e.g., eNB) for receiving uplink channels and uplink signals. The base station includes: a controller and a receiver. The controller may be configured to configure a dual connectivity in a UE. The receiver is configured to receive uplink channels and uplink signals from the UE. The uplink channel and the uplink signals are transmitted based on a maximum uplink transmission power for a cell group including one or more cells provided by the base station.

In accordance with another aspect of the present disclosure, there is provided a method of configuring a simultaneous transmission indicator of uplink channels and uplink signals to an UE by an eNB. The method includes: configuring a dual connectivity to the UE; independently configuring a simultaneous transmission indicator (Simultaneous_PUCCH-PUSCH) configuration for an uplink channel and a data channel (PUCCH and PUSCH) with respect to multiple cell groups including one or more serving cells; and independently configuring a simultaneous transmission indicator (ackNackSRS-Simultaneous Transmission) configuration for an uplink control channel (PUCCH) and an uplink signal (SRS) for each cell group.

In accordance with another aspect of the present disclosure, there is provided a method of transmitting a simultaneous transmission of uplink channels and uplink signals by a UE, configured by dual connectivity, from an eNB to multiple cell groups. The method includes: allowing the UE to simultaneously transmit uplink channels and signals according to a simultaneous transmission indicator (Simultaneous_PUCCH-PUSCH) configuration for an uplink control channel and a data channel (PUCCH+PUSCH) and a simultaneous transmission indicator (ackNackSRS-SimultaneousTransmission) configuration for an uplink control channel (PUCCH) and an uplink signal (SRS), with respect to each of multiple cell groups each including at least one of serving cells which are independently indicated from the base station.

As described above, the present disclosure can provide a specific method of controlling an uplink transmission power as a UE transmits uplink channels and signals in a dual connectivity environment.

Further, the present disclosure can provide a method and an apparatus for allocating a specific transmission power for each signal as a UE simultaneously transmits uplink channels and signals in a dual connectivity environment.

Further, the present disclosure can provide a method and an apparatus for performing a simultaneous transmission of uplink channels and signals according to an independent transmission indicator configuration for each cell group for a simultaneous transmission of channels and signals transmitted to each cell group as a UE simultaneously transmits an uplink channel and signal in a dual connectivity environment.

DETAILED DESCRIPTION OF THE EXEMPLARY EMBODIMENTS

Figure 1:
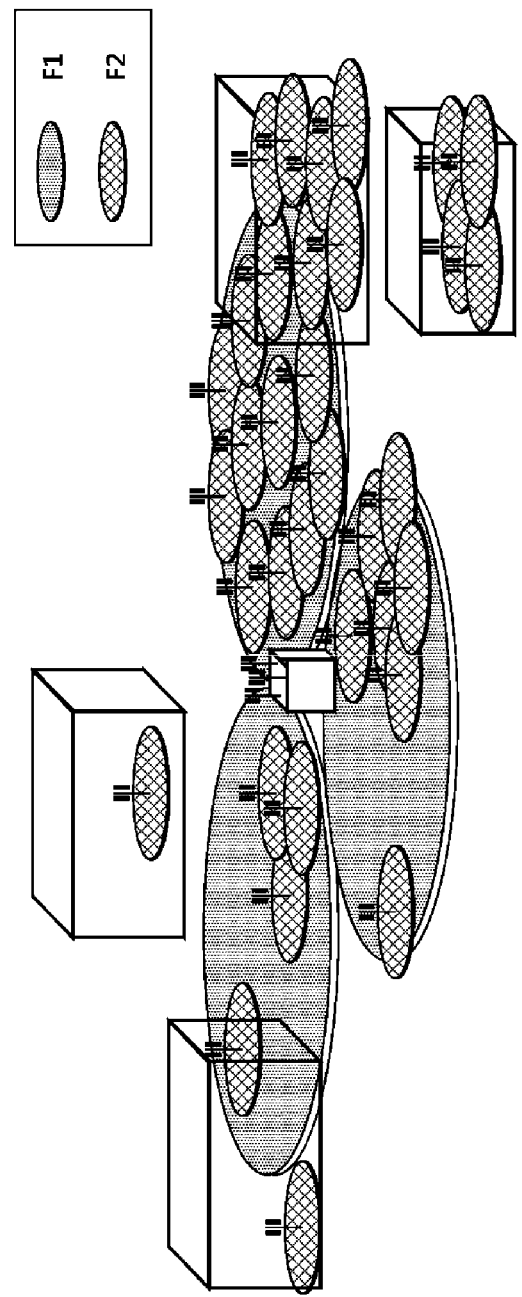
FIG. 1 is a diagram illustrating small cell deployment according to an embodiment.

Hereinafter, exemplary embodiments of the present disclosure will be described with reference to the accompanying drawings. In adding reference numerals in components of each drawing, the same components will be designated by the same reference numerals although they are shown in different drawings. Further, in the following description of the present disclosure, a detailed description of known functions and configurations incorporated herein will be omitted when it may make the subject matter of the present invention rather unclear.

The wireless communication system may be widely deployed to provide various communication services such as a voice service and a packet data service. The wireless communication system may include a User Equipment (UE) and a Base Station (BS or an eNB). Throughout the specifications, the user equipment may be an inclusive concept indicating a user equipment utilized in wireless communication, including a User Equipment (UE) in wideband code division multiple access (WCDMA), long term evolution (LTE), high speed packet access (HSPA), and the like, and an Mobile station (MS), a User Terminal (UT), an Subscriber Station (SS), a wireless device, and the like in global system for mobile communications (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, an base station (e.g., eNB 20) or the cell may be construed as an inclusive concept indicating a portion of an area covered by a Base Station Controller (BSC) in code division multiple access (CDMA), a NodeB in wideband CDMA (WCDMA), an eNB or a sector (site) in LTE, and the like, and the concept may include various coverage areas, such as a megacell, a macrocell, a microcell, a picocell, a femtocell, a communication range of a relay node, an RRH, an RU, a small cell, and the like.

Each of the above mentioned various cells has a base station that controls a corresponding cell, and thus, the base station may be construed in two ways; i) the base station may be a device itself that provides a megacell, a macrocell, a microcell, a picocell, a femtocell, and a small cell in association with a wireless area; or ii) the base station may indicate a wireless service area itself. In case of i), the base station may denote all devices that provide a predetermined wireless service area and are controlled by an identical entity and that interact with one another to cooperatively configure the wireless service area. Based on a configuration type of a wireless service area, the base station may include an eNB, an RRH, an antenna, an RU, a Low Power Node (LPN), a point, a transmission/reception point, a transmission point, a reception point, and the like. In case of ii), the base station may denote a wireless service area itself that receives or transmits a signal from a perspective of a UE or a neighboring base station.

Therefore, the base station may be commonly referred to as a megacell, a macrocell, a microcell, a picocell, a femtocell, a small cell, an RRH, an antenna, an RU, an LPN, a point, an eNB, a transmission/reception point, a transmission point, and a reception point.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

The wireless communication system may adapt various types of multiple access schemes. For example, the wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. At least one embodiment of the present disclosure may be applicable to resource allocation in an asynchronous wireless communication scheme including GSM, WCDMA, and HSPA, to be LTE and LTE-advanced, and may be also applicable to resource allocation in a synchronous wireless communication scheme including CDMA, CDMA-2000, and UMB. Embodiments of the present disclosure may not be limited to a specific wireless communication field, and may include all technical fields to which the technical idea of embodiments of the present disclosure is applicable.

Uplink transmission and downlink transmission may be performed based on a Time Division Duplex (TDD) scheme that performs transmission based on different times, or based on a Frequency Division Duplex (FFD) scheme that performs transmission based on different frequencies.

Further, a communication system such as LTE and LTE-A may configure an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), and the like, and may be configured as a data channel, such as a Physical Downlink Shared Channel (PDSCH), a Physical Uplink Shared Channel (PUSCH), and the like, to transmit data.

Control information may be transmitted using an enhanced PDCCH or extended PDCCH (EPDCCH).

In the specification, a cell may denote a coverage of a signal transmitted from a transmission/reception point, a component carrier having the coverage of the signal transmitted from the transmission/reception point (e.g., transmission point or transmission/reception point), or the transmission/reception point itself.

A wireless communication system, according to embodiments, may be a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station, a macro cell (hereinafter, referred to as an 'eNB'), or at least one RRH that is connected to the eNB through an optical cable or an optical fiber, is wiredly controlled, and has a high transmission power or a low transmission power within a macro cell area.

Hereinafter, a downlink denotes communication or a communication path from a multi-transmission/reception point to a terminal, and an uplink denotes communication or a communication path from a UE to a multi-transmission/reception point. In a downlink, a transmitter may be a part of a multiple transmission/reception point and a receiver may be a part of a terminal. In an uplink, a transmitter may be a part of a UE and a receiver may be a part of a multiple transmission/reception point.

Hereinafter, transmission and reception of a signal through a PUCCH, a PUSCH, a PDCCH, an EPDCCH, a PDSCH, or the like may be expressed as "a PUCCH, a PUSCH, a PDCCH, an EPDCCH or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a downlink control channel used herein may denote a PDCCH or an EPDCCH, and may denote both a PDCCH and an EPDCCH.

In the specification, for ease of description, some embodiments are described based on PDCCH and other embodiments are described based on EPDCCH. However, embodiments of the present disclosure are not limited thereto. Both of EPDCCH and PDCCH can be applied to embodiments of the present disclosure.

Hereinafter, higher layer signaling includes a radio resource control (RRC) signaling that transmits RRC information including an RRC parameter.

An eNB performs downlink transmission to UEs. The eNB may transmit a Physical Downlink Shared Channel (PDSCH) as a primary physical channel for unicast transmission and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Hereinafter, a small cell deployment scenario related to at least one embodiment of the present disclosure will be described.

FIG. 1 is a diagram illustrating small cell deployment according to an embodiment.

Figure 2:
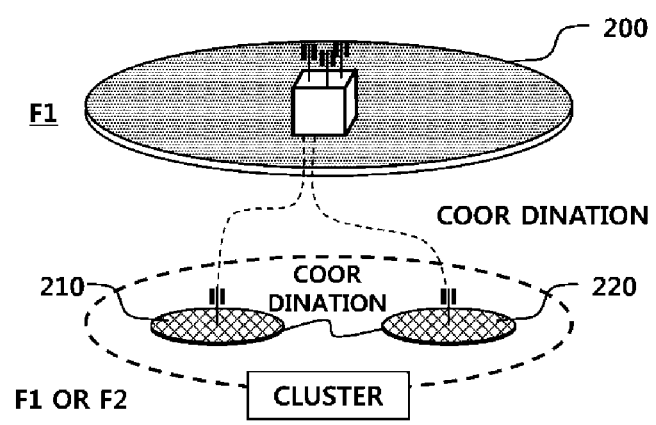
FIG. 2 is a diagram illustrating small cell deployment scenario.
Figure 3:
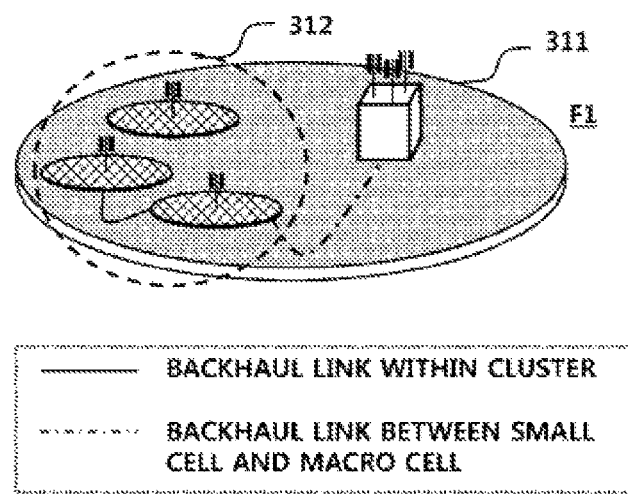
FIG. 3 to FIG. 6 are diagrams illustrating detailed scenarios of small cell deployment.

FIG. 1 illustrates overall communication environment where small cells coexist with macro cells. FIG. 2 and FIG. 3 illustrate small cell deployments according to whether a macro coverage is present, according to whether a corresponding small cell is for outdoor or indoor, according to whether small cell deployment is sparse or dense, and according to whether a frequency spectrum identical to a macro cell is used.

FIG. 2 is a diagram illustrating a small cell deployment scenario. FIG. 2 illustrates a general configuration of a scenario shown in FIG. 3. FIG. 2 illustrates a small cell deployment scenario, and includes scenarios #1, #2a, #2b, and #3. A reference numeral 200 indicates a macro cell. Reference numerals 210 and 220 indicate small cells. In FIG. 2, a macro cell that overlaps a small cell may or may not exist. Coordination may be performed between the macro cell 200 and the small cell 210 and 220, or between the small cells 210 and 220. An overlap area of the macro cell 200, the small cell 210, and the small cell 220 may be bound as a cluster.

FIG. 3 through FIG. 6 are diagrams illustrating detailed scenarios of a small cell deployment.

FIG. 3 illustrates scenario #1 of the small cell deployment. Scenario #1 corresponds to a co-channel deployment scenario of a small cell and a macro cell, including an overhead macro, and corresponds to an outdoor small cell scenario. FIG. 3 indicates a case in which all of a macro cell 311 and small cells are outdoor cells, and reference numeral 312 indicates a small cell cluster. Users are distributed in both the indoor and outdoor cells.

Solid lines connecting small cells in a small cell cluster 312 indicate a backhaul link within a cluster. A broken line connecting an eNB of the macro cell and the small cells in the cluster indicates a backhaul link between small cells and a macro cell.

Figure 4:
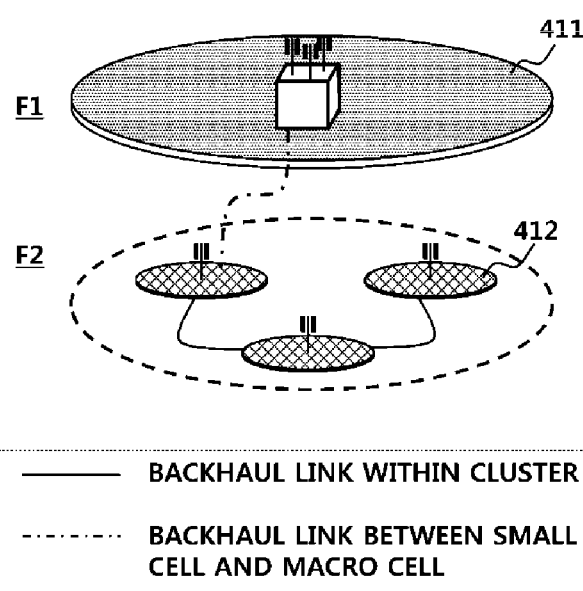

FIG. 4 illustrates small cell deployment scenario #2a. The scenario #2a corresponds to a deployment scenario in which a small cell and a macro cell use different frequency spectrums, including an overlaid macro, and corresponds to an outdoor small cell scenario. A macro cell 411 and small cells are for outdoor cells, and reference numeral 412 indicates a small cell cluster. Users are distributed in both the indoor and outdoor cells.

Solid lines connecting small cells in the small cell cluster 412 indicate a backhaul link within a cluster. A broken line connecting an eNB of the macro cell and the small cells in the cluster indicates a backhaul link between small cells and a macro cell.

Figure 5:
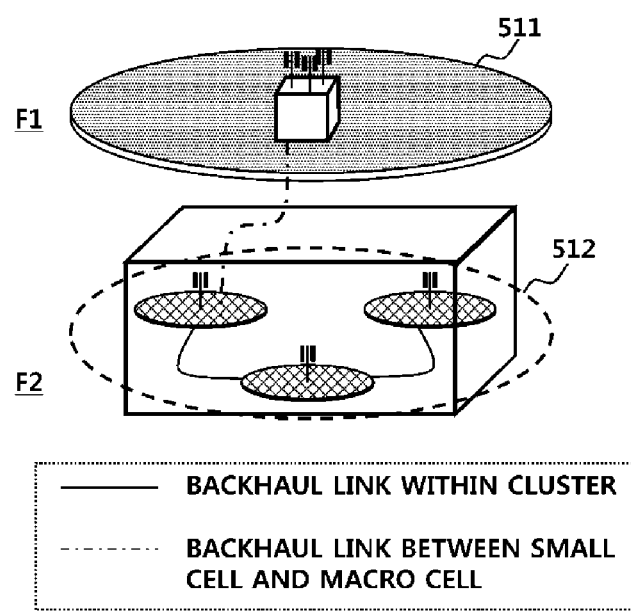

FIG. 5 illustrates small cell deployment scenario #2b. The scenario #2b corresponds to a deployment scenario in which a small cell and a macro cell use different frequency spectrums, including an overlaid macro, and corresponds to an indoor small cell scenario. A macro cell 511 is an indoor cell and all small cells are indoor cells, and reference numeral 512 indicates a small cell cluster. Users are distributed in both the indoor and outdoor cells.

Solid lines connecting small cells in the small cell cluster 512 indicate a backhaul link within a cluster. A broken line connecting an eNB of the macro cell and the small cells in the cluster indicates a backhaul link between small cells and a macro cell.

Figure 6:
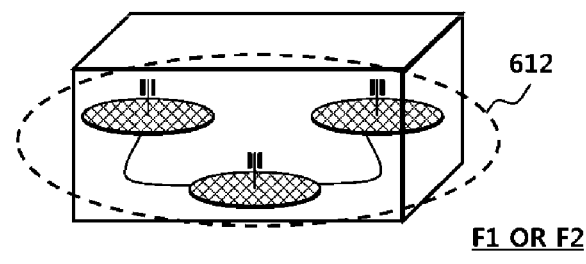

FIG. 6 illustrates scenario #3 of the small cell deployment. The scenario #3 corresponds to an indoor small cell scenario under assumption that the coverage of a macro does not exist. Reference numeral 612 indicates a small cell cluster. In addition, all small cells are indoor cells, and users are distributed in both the indoor and outdoor cells.

Solid lines connecting small cells in the small cell cluster 612 indicate a backhaul link within a cluster. A broken line connecting an eNB of the macro cell and the small cells in the cluster indicates a backhaul link between small cells and a macro cell.

Frequencies F1 and F2 used in various small cells of FIG. 1 to FIG. 6 may be frequencies for supporting identical duplex modes. Or, the frequencies F1 and F2 may have different duplex modes. For example, the frequency F1 may be considered as a frequency supporting a FFD mode and the frequency F2 may be considered as a frequency supporting a TDD mode, or vice versa.

Figure 7:
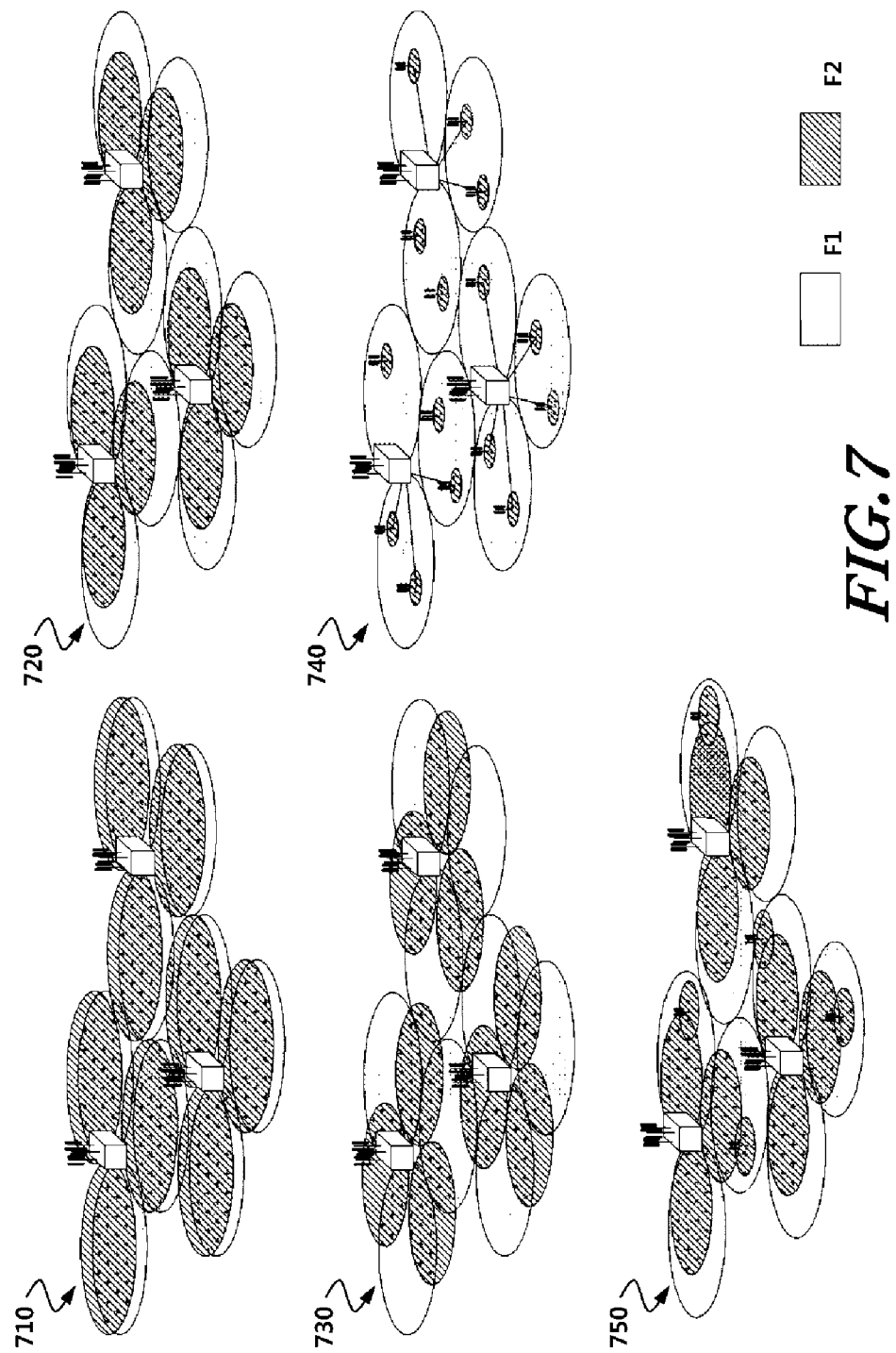
FIG. 7 is a diagram illustrating various scenarios of carrier aggregation.

FIG. 7 is a diagram illustrating various scenarios of a carrier aggregation.

As shown in FIG. 7, in such carrier aggregation scenario, frequencies F1 and F2 may be considered as frequencies supporting identical duplex modes or as frequencies supporting different duplex modes.

Reference numeral 710 indicates F1 and F2 cells which are co-located and overlaid under an almost identical coverage. Reference numeral 710 indicates a scenario where two layers provide sufficient coverage and mobility and aggregation can be performed between the overlaid F1 and F2 cells.

Reference numeral 720 indicates a scenario where F1 and F2 cells are co-located and overlaid, and a service coverage area of the F2 cell is smaller than that of the F1 cell. The reference numeral 720 indicates a scenario where the F1 cell has sufficient service coverage, mobility is supported based on the service coverage of the F1 cell, the F2 cell is used to improve throughputs, and aggregation can be performed between the overlaid F1 and F2 cells.

Reference numeral 730 indicates a scenario where F1 and F2 cells are co-located and F2 antennas are directed to a cell edge in order to increase cell edge throughputs. The reference numeral 730 indicates a scenario where the mobility support is performed based on the service coverage of the F1 cell, the F1 cell has sufficient service coverage, and the F2 cell provisionally has a coverage hole. In such a scenario, the F1 and F2 cells can be aggregated where the F1 and F2 cells of the same eNB have overlaid service coverage.

Reference numeral 740 indicates a scenario where F1 denotes macro coverage and F2 denotes a RRH used to improve throughputs in a hot spot area, the mobility support is performed based on the F1 macro coverage, and F1 macro cells and a F2 RRH cells can be merged.

Reference numeral 750 indicates a scenario where frequency selective repeaters are deployed to extend the coverage of a carrier, similarly to the scenario indicated by reference numeral 720. The reference numeral 750 indicates a scenario where F1 and F2 cells of an identical eNB can be merged where F1 and F2 cell have overlaid coverage.

For an example of an uplink channel, a Physical Uplink Control Channel (PUCCH) which is used as an uplink control channel will be shortly described. In the PUCCH, a format is classified according to a type of information transmitted from a terminal. A type of the format for the PUCCH and a purpose thereof will be described below.

PUCCH format 1: is a channel format transmitting only a scheduling request.

PUCCH format 1a/1b: is classified into format 1a or format 1b according to the number of bits and a modulation scheme as a channel transmitting a scheduling request and/or response information (e.g., Ack/Nack) for a downlink data channel.

Shortened PUCCH format 1a/1b: is a PUCCH format transmitting Ack/Nack with a last SC-FDMA symbol of a sub-frame punctured. The use of the shortened PUCCH format 1a/1b is determined based on a RRC parameter by an indication of an upper layer of the base station, TRUE/FALSE of ackNackSRS-SimultaneousTransmission, and cell specific information of a sounding reference signal (SRS).

PUCCH format 2: is a channel format that transmits only a Channel Quality Indication (CQI).

PUCCH format 2a/2b: is classified into a format 2a or a format 2b according to the number of bits of Ack/Nack and a modulation scheme as a channel transmitting Ack/Nack for CQI+a downlink data channel.

PUCCH format 3: is a channel format for transmitting 4 bit or more Ack/Nack under downlink carrier aggregation.

Shortened PUCCH format 3: is a PUCCH format 3 transmitting Ack/Nack with a last SC-FDMA symbol of a sub-frame punctured. The use of the shorted PUCCH format 3 is determined based on an RRC parameter by an indication of an upper layer of a base station, TRUE/FALSE of ackNack SRS-Simultaneous Transmission, and cell specific information of a Sounding Reference Signal (SRS).

Hereinafter, a method for controlling transmission power of an uplink channel or an uplink signal under carrier aggregation when PUCCH is transmitted in one serving cell without considering multiple PUCCH will be described. In particular, as a method for power control between uplink transmission channels, between an uplink channel and a sounding reference signal, and between sounding reference signals, a method for a power limited case and a method for a non-power limited case will be briefly described. The power limited case denotes when power of a user equipment is limited, and the non-power limited case denotes when the power of a user equipment is not limited.

When a sum of total transmission powers of a UE configured to simultaneously transmit PUCCH and PUSCH exceeds $\hat{P}_{CMAX}(i)$, the UE determines a transmission power of the PUSCH for a serving cell in order to prioritize a transmission power of the PUCCH. The UE determines the transmission power of a corresponding PUSCH by scaling the transmission power as a value between 0 and 1 with respect to the remaining transmission power after allocating the PUCCH transmission power. That is, the UE determines the transmission power of the corresponding PUSCH using Equation 1.

$$\sum_c w(i)\cdot \hat{P}_{PUSCH,c}(i) \le \left(\hat{P}_{CMAX}(i) - \hat{P}_{PUCCH}(i)\right) \qquad \text{Equation 1}$$

$\hat{P}_{PUCCH}(i)$ is a linear value of $P_{PUCCH}(i)$, $\hat{P}_{PUSCH,c}(i)$ is a liner value of $P_{PUSCH,c}(i)$, $\hat{P}_{CMAX}(i)$ is a linear value of $P_{CMAX}(i)$ which is a total maximum output power configured in the UE in a sub-frame i. w(i) is a scaling factor of $\hat{P}_{PUSCH,c}(i)$ for a serving cell c and has a value between 0 and 1.

When a sum of total transmission powers of a UE exceeds $\hat{P}_{CMAX}(i)$, the UE determines a transmission power between PUSCHs transmitted from different carriers or different serving cells based on whether information in the corresponding PUSCH includes Uplink Control Information (UCI). In particular, the UE prioritizes a serving cell or a component carrier which transmits a PUSCH having the UCI to allocate the PUSCH transmission power, and the UE performs scaling with identical scaling factors between remaining serving cell(s) or component carriers to determine a transmission power of the PUSCH. Herein, the scaling factor may be configured as 0 for the specific serving cell(s) or the component carrier. That is, the UE determines the transmission power of the corresponding PUSCH using equation 2.

$$\sum_{c\ne j} w(i)\cdot \hat{P}_{PUSCH,c}(i) \le \left(\hat{P}_{CMAX}(i) - \hat{P}_{PUSCH,j}(i)\right). \qquad \text{Equation 2}$$

If a UE transmits a PUSCH including UCI in a serving cell j, transmits a PUSCH not including UCI in remaining serving cell(s), and a sum of transmission powers to transmit corresponding PUSCHs exceed $\hat{P}_{CMAX}(i)$, the UE may allocate the transmission power using equation 2. $\hat{P}_{PUSCH,j}(i)$ is a transmission power for a cell including UCI, and w(i) is a scaling factor of $\hat{P}_{PUSCH,c}(i)$ for a serving cell c not including the UCI.

When the sum of the total transmission power of the UE exceeds $\hat{P}_{CMAX}(i)$, in determining the transmission power for transmission between PUSCHs having no UCI and the transmission power for "PUCCH+PUSCH with UCI" which are transmitted through different carriers or from different serving cell in the UE, a transmission power of the PUCCH is configured to be ensured in the priority, a transmission power of a PUSCH having UCI is configured to be ensured, and then, with respect to the remaining transmission power of the UE, the UE performs a scaling while having identical scaling factors between remaining serving cell(s) or component carriers to determine the transmission power of the PUSCH. Herein, the specific serving cell(s) or the component carrier may configure the scaling factor as 0. That is, the UE determines a transmission power of a corresponding PUSCH using equation 3.

$$\hat{P}_{PUSCH,j}(i) = \min\left(\hat{P}_{PUSCH,j}(i), \left(\hat{P}_{CMAX}(i) - \hat{P}_{PUCCH}(i)\right)\right) \qquad \text{Equation 3}$$

and $$\sum_{c\ne j} w(i)\cdot \hat{P}_{PUSCH,c}(i) \le \left(\hat{P}_{CMAX}(i) - \hat{P}_{PUCCH}(i) - \hat{P}_{PUSCH,j}(i)\right)$$

When the sum of the total transmission powers of the UE exceeds $\hat{P}_{CMAX}(i)$, in determining the transmission power for transmission between SRSs which are transmitted through different carriers or from different serving cell in the UE, the UE performs a scaling while having identical scaling factors between serving cell(s) or component carriers to determine transmission powers of the SRSs. That is, the UE determines transmission powers of corresponding SRSs using equation 4.

$$\sum_c w(i)\cdot \hat{P}_{SRS,c}(i) \le \hat{P}_{CMAX}(i) \qquad \text{Equation 4}$$

In equation 4, $\hat{P}_{SRS,c}(i)$ is a linear value of $P_{SRS,c}(i)$, $\hat{P}_{CMAX}(i)$ is a linear value of $P_{CMAX}(i)$ which is a total maximum output power configured in a UE in a sub-frame i. w(i) is a scaling factor of $\hat{P}P_{SRS,c}(i)$ for a serving cell c and has a value between 0 and 1.

(Dual Connectivity)

Figure 8:
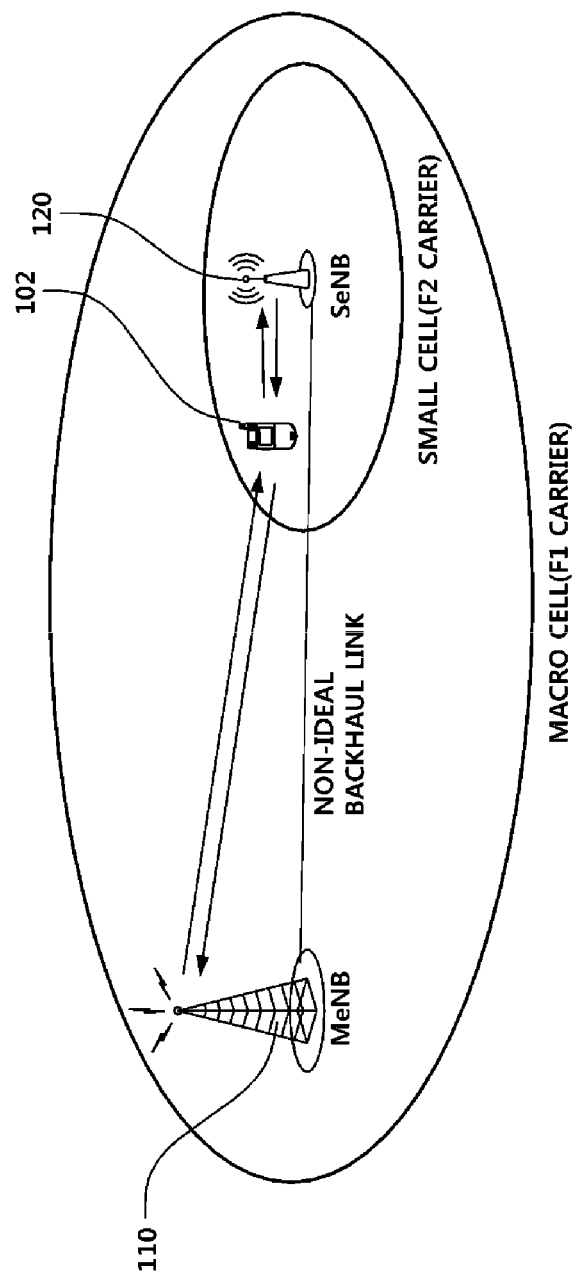
FIG. 8 is a diagram illustrating a dual connectivity scenario according to embodiments of the present disclosure.

FIG. 8 is a diagram illustrating an example of a dual connectivity scenario according to the present invention.

A scenario of FIG. 8 relates to inter-node radio resource aggregation to improve a UE transmission rate from different nodes under dual connectivity and this relates to a radio resource aggregation through one or more base stations to transmit user plane data.

The dual connectivity indicates an operation in which an RRC-connected UE uses radio resources provided by two or more different network points (e.g., a master eNB and secondary eNBs) connected with a non-ideal backhaul. In the dual connectivity, the master eNB refers to a base station which terminates S1-MME and acts as a mobility anchor toward a Core Network (CN). The master eNB may be referred to as a master base station, a MeNB, a Macro eNB, or a macro eNB. In the dual connectivity, a secondary eNB refers to a base station, not the master eNB, providing additional radio resources to user equipment. The secondary eNB may be referred to as a secondary base station, a SeNB, a small cell eNB, a small eNB, or an assisting eNB. A group of serving cells related to a MeNB is referred to as a Master Cell Group (MCG) and a group of serving cells related to the SeNB is referred to as a Secondary Cell Group (SCG). Herein, the related serving cells may refer to serving cells provided by corresponding base stations.

The SeNB has one specific cell including PUCCH. That is, at least one serving cell related to the SeNB has a configured uplink. Further, at least one cell in SeNB has a configured UL and one of them is configured with PUCCH resources.

Figure 9:
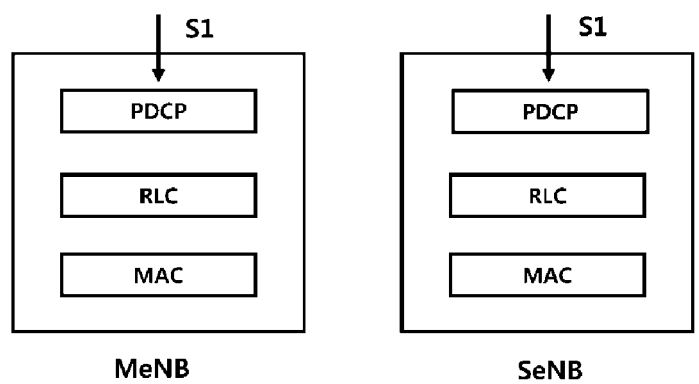
FIG. 9 is a diagram illustrating an example of a dual connectivity structure.

FIG. 9 is a diagram illustrating an example of a dual connectivity structure.

FIG. 9 illustrates an example of the dual connectivity structure using radio resources provided by two base stations (e.g., eNBs) which are connected with a non-ideal backhaul. When a UE is configured with the dual connectivity as shown in FIG. 9, the UE may configure specific data as a specific eNB dedicated bearer. For example, the UE may configure a specific radio bearer for a voice service as a MeNB dedicated data radio bearer (e.g., a MCG radio bearer) and may configure a specific bearer for an Internet service as a SeNB dedicated data radio bearer (e.g., a SCG radio bearer). With respect to a specific MCG data radio bearer or a specific SCG radio bearer, only one base station (e.g., eNB) has a PDCP entity, an RLC entity, and a MAC entity. The UE has an entity in the UE peered to the entity.

Figure 10:
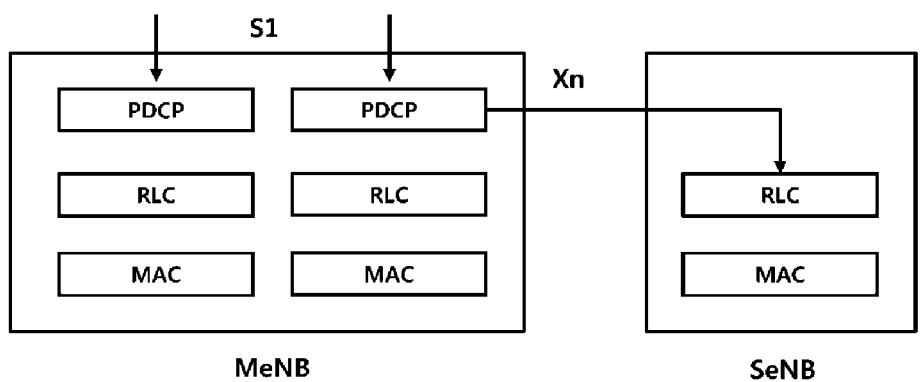
FIG. 10 is a diagram illustrating another example of a dual connectivity structure.

FIG. 10 is a diagram illustrating another example of a dual connectivity structure.

FIG. 10 shows another example of the dual connectivity structure using radio resources provided by two base stations (e.g., eNBs) which are connected with a non-ideal backhaul. When a UE is configured with the dual connectivity as shown in FIG. 10, the UE may split a specific data radio bearer through two eNBs (MeNB and SeNB) and then be configured. Hereinafter, the bearer which is configured by being split through the two eNBs is referred to as a split radio bearer (MCG-SCG radio bearer) or a split bearer. With respect to a specific split data radio bearer, each eNB has an independent RLC entity (e.g., a MeNB has a MeNB RLC entity and a SeNB has a SeNB RLC entity) and a MAC entity (e.g., a MeNB has a MeNB MAC entity and a SeNB has a SeNB MAC entity). The UE has an entity in the UE peered to the entity.

In this specification, as the UE configures the dual connectivity, a master base station (e.g., master eNB) or a first base station (e.g., first eNB) may denotes a base station (e.g., eNB) providing a connection between the UE and the RRC, a base station (e.g., eNB) providing a cell (e.g., a Pcell) which is a reference of a handover, a base station (e.g., eNB) terminating an S1-MME and a base station (e.g., eNB) acting a mobility anchor with respect to a core network.

The master base station (e.g., master eNB) or the first base station (e.g., first eNB) may be an eNB providing a macro cell and may be an eNB providing any one small cell in a dual connectivity environment between the small cells.

Meanwhile, in the dual connectivity environment, a secondary base station (e.g., secondary eNB) or a second base station (e.g., second eNB) may denote an eNB distinguished with the master eNB and providing additional radio resources in the UE.

The first eNB (e.g., master eNB) and the second eNB (e.g., secondary eNB) may provide one or more cells to each UE and the first eNB and the second eNB may be connected through an interface between the first eNB and the second eNB.

Further, for convenience and ease of understanding, a cell related to the first eNB may be described as the macro cell and a cell related to the second eNB may be described as the small cell. However, the present embodiments are not limited thereto. For example, a cell related to the first eNB may be described as a small cell in a small cell cluster scenario below.

The macro cell of the present embodiment may denote each one of cells or a represented one of entire cells related to the first eNB. In addition, the small cell may denote each one of cells and a represented one of entire cells related to the second eNB. However, in a specific scenario, the small cell cluster may denote a cell related to the first eNB and a cell of the second eNB may be described as another small cell or still another small cell.

However, for convenience and ease of understanding, the macro cell is associated with the master eNB or the first eNB and the small cell is associated with the secondary eNB or the second eNB. However, the present embodiments are not limited thereto and the secondary eNB or the second eNB may be associated with the macro cell and the master eNB or the first eNB may be associated with the small cell.

When a UE simultaneously transmits the uplink data, the control channel, and the uplink signal to a base station under carrier aggregation not the dual connectivity environment, only PUCCH transmission of one serving cell (e.g., a primary serving cell) has been considered and the PUCCH transmission of another serving cell has not been considered. Further, it has been considered only that multiple cells or component carriers are configured under one eNB. However, it has not been considered that PUCCH is transmitted from each one cell under different eNBs so as to allow different eNBs to configure the multiple cells or the component carriers. Therefore, when it is considered that the PUCCH is transmitted from a PCell of the MeNB, the PUCCH is transmitted from another serving cell, and the PUCCH is transmitted from a serving cell including a part of a PCell function in the SeNB, it is required to newly define a multiplexing method or power control methods. That is, as the UE transmits the uplink data, the control channel, and the uplink signal to the eNB, an ambiguity is generated so that the eNB and the UE cannot know how to be performed an operation of the UE. Therefore, when the multiple PUCCH has been configured, it is required to newly define multiplexing methods and power control methods for the uplink channels (e.g., PUCCH, PUSCH, and PRACH) and combinations for the uplink signal (SRS), which are transmitted by the UE.

The present embodiments propose a method of multiplexing uplink channel or signals among service cells (e.g., cell group) of a same base station or among service cells of different base stations in order to enable a user equipment to transmit uplink channels or signals to different base stations when PUCCH is transmitted from another serving cell, not the Pcell, under the small cell environment (i.e., when a dual connectivity is configured to enable transmission to the MeNB (e.g., Master eNB) and the SeNB (e.g., Secondary eNB) which are different each other, or enable a reception from the MeNB and the SeNB which are different from each other). Furthermore, the present embodiments propose a method of controlling a transmission power of the UE according to this and an apparatus thereof. The present embodiments provide a multiplexing method, a power control method, and an apparatus thereof for enabling a user equipment to simultaneously transmit uplink channels and signals (e.g., PUCCH, PUSCH, PRACH and SRSs) when a PCell is configured for transmitting the PUCCH from a Master Cell Group (MCG) and a cell transmitting the PUCCH from a Secondary Cell Group (SCG).

Figure 11:
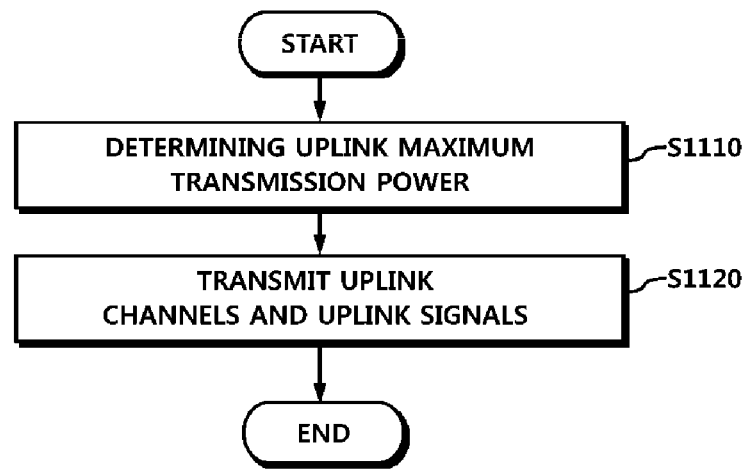
FIG. 11 is a diagram illustrating operations of a UE according to embodiments of the present disclosure.

FIG. 11 is a flowchart illustrating operations of a User Equipment (UE) according to an embodiment of the present disclosure.

In accordance with at least one embodiment, an operation of a UE for controlling an uplink transmission power may include determining a maximum uplink transmission power of each one of a plurality of cell groups, each including at least one serving cell, and transmitting uplink channels and uplink signals of each one of the plurality of cell groups using the determined maximum uplink transmission power of each one of the plurality of cell groups.

Referring to FIG. 11, the UE may perform operations of determining a maximum uplink transmission power for each one of a plurality of cell groups each including one or more serving cells (S1110). The UE may determine the maximum uplink transmission power of each cell group. For example, the UE may determine a maximum uplink transmission power for a Master Cell Group (MCG) which is a group of one or more serving cells related to a master eNB. Similarly, the UE may determine a maximum uplink transmission power for a Secondary Cell Group (SCG) which is a group of one or more serving cells related to a secondary eNB. That is, the UE may determine the maximum uplink transmission power with respect to each cell group in a dual connectivity environment. The maximum uplink transmission power determined for each cell group may be identically configured and may be differently configured.

For example, a sum of maximum uplink transmission powers of each one of the plurality of cell groups may be determined to be less than or equal to a total maximum transmission power of the UE. Specifically, a sum of the maximum uplink transmission power of the MCG and the maximum uplink transmission power of SCG may be determined to be identical to the total maximum transmission power of the UE. Further, the sum of the maximum uplink transmission power of the MCG and the maximum uplink transmission power of SCG may be determined to be less than the total maximum transmission power of the UE. That is, when it is assumed that the total maximum transmission power of the UE is 100, the maximum uplink transmission power for the MCG may be configured as 50 and the maximum uplink transmission power for the SCG may be configured as 30.

Meanwhile, when the UE determines transmission power for one or more uplink channels or uplink signals, the UE may independently determine transmission power in each cell group using the maximum uplink transmission power for the each cell group. For example, a transmission power for being simultaneously transmitted between uplink channels or between the uplink channels and the uplink signals may be determined on the basis of the maximum uplink transmission power of each cell group.

For example, transmission power for simultaneous transmission between the uplink channels may include transmission power for a simultaneous transmission between a PUCCH and a PUSCH. For another example, the transmission power for simultaneous transmission between the uplink channels and the uplink signals may include transmission power for simultaneous transmission between a PUCCH/PUSCH and a SRS.

Further, the transmission power for transmitting the uplink channels and the uplink signals may be preferentially determined from each one of the plurality of cell group and then be mutually determined each cell group. In other words, transmission power of each channel or a signal is independently determined in each cell group using a maximum uplink transmission power determined in the each cell group. Then, transmission power between cell groups is determined. For example, the transmission power of each uplink channel and signal is primarily determined in a cell group including a serving cell where the uplink channels and signals are transmitted. Then, when every uplink channels or signals of the transmission power is allocated in any one cell group and there is a remaining transmission power, the remaining transmission power may be used as a transmission power of an uplink channel or signal of another cell group.

In addition, the UE may perform operations of transmitting uplink channels and uplink signals of the plurality of cell groups using the maximum uplink transmission power of each one of the plurality of cell groups (S1120). The uplink channels and signals may be transmitted to the eNB with the transmission power allocated by a method of allocating the transmission power.

Hereinafter, a method of determining a transmission power according to the transmission of each uplink channel or signal will be described.

Figure 12:
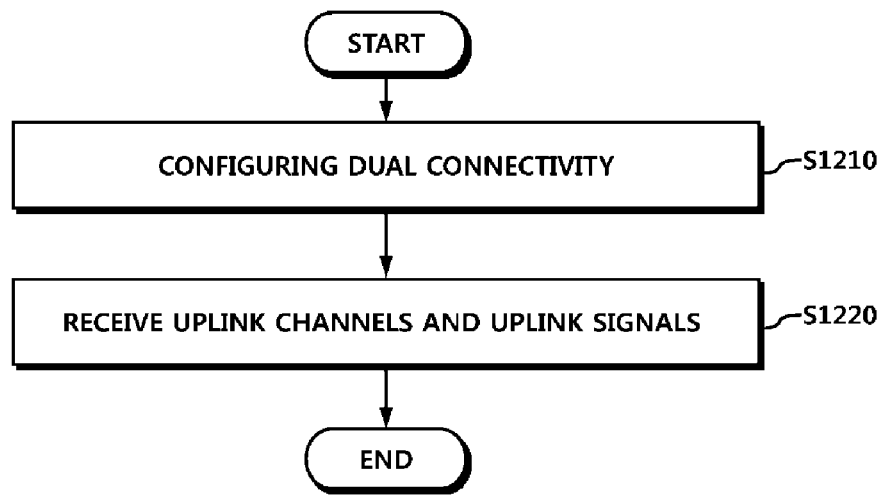
FIG. 12 is a diagram illustrating an operation of a base station (e.g., eNB) according to embodiments of the present disclosure.

FIG. 12 is a flowchart illustrating operations of a base station (e.g., eNB) according to another embodiment of the present disclosure.

In accordance with at least one embodiment, a method of a base station (e.g., an eNB) for receiving uplink channels and uplink signals may include configuring a dual connectivity in a UE and receiving the uplink channels and uplink signals from the UE. Herein, the uplink channels and the uplink signals may be transmitted on the basis of a maximum uplink transmission power for a cell group including one or more cell provided by the eNB.

Referring to FIG. 12, the eNB may perform operations of configuring a dual connectivity (S1210). For example, the eNB may be a MeNB or a SeNB. When the eNB is the MeNB, a dual connectivity may be configured in the UE together with the SeNB. Similarly, when the eNB is the SeNB, the dual connectivity may be configured in the UE together with the MeNB. Through this, the eNB may configure the bearer as shown in FIG. 9 or FIG. 10 to configure a dual connectivity for the UE.

Meanwhile, an uplink channel and an uplink signal transmitted by the UE may be received from one sub-frame. Further, the uplink channel and the uplink signal may be a signal transmitted on the basis of a transmission power for simultaneous transmission between the uplink channels or between the uplink channel and the uplink signal.

For example, the transmission power for simultaneous transmission between the uplink channels may include transmission power for simultaneous transmission between a PUCCH and a PUSCH. For another example, the transmission power for the simultaneous transmission between the uplink channels and the uplink signals may include transmission power for simultaneous transmission between a PUCCH/PUSCH and a SRS. In other words, uplink channels or uplink signals received from the eNB by the UE configuring the dual connectivity as described above may be channels or signals transmitted by determined transmission power on the basis of an maximum uplink transmission power of a cell group related to a corresponding eNB. When the uplink channels or the uplink signals are simultaneously transmitted, transmission power of corresponding uplink channels or signals may be preferentially determined by maximum transmission power of a cell group related to a corresponding eNB. That is, the transmission power of the uplink channels or signals is preferentially determined on the basis of the maximum transmission power for the cell group related to the eNB and then the remaining transmission power may be allocated from the maximum transmission power for a cell group related to another eNB according to the need.

Figure 13:
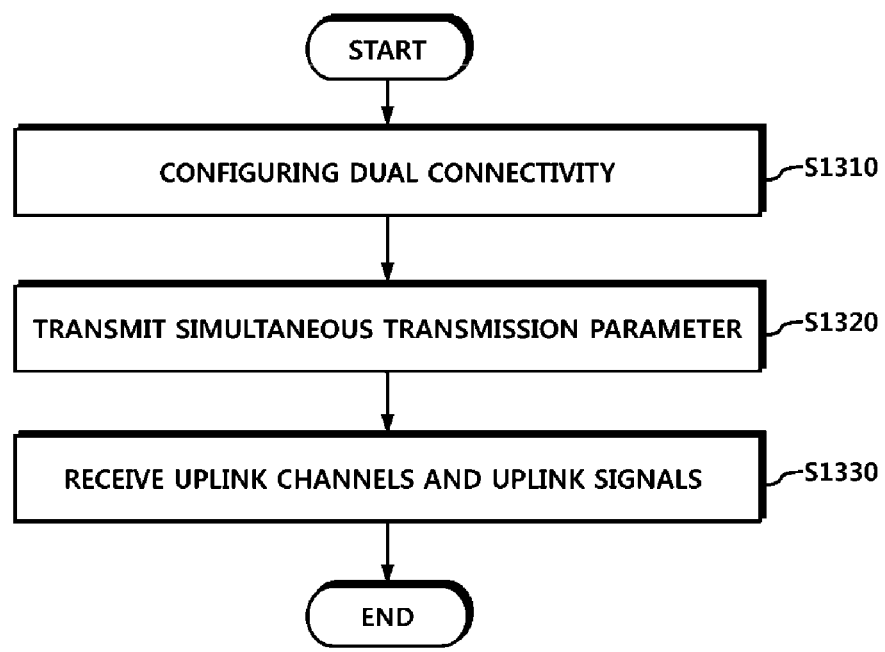
FIG. 13 is a diagram illustrating an operation of a base station (e.g., eNB) according to embodiments of the present disclosure.

FIG. 13 is a diagram illustrating operations of a base station (e.g., eNB) according to another embodiment of the present disclosure.

Referring to FIG. 13, in accordance with at least one embodiment, the operations of the eNB may further include transmitting a simultaneous transmission parameter for simultaneous transmission between uplink channels or between uplink channels and uplink signals.

Specifically, the eNB may configure the dual connectivity with respect to another eNB (S1310). The dual connectivity may be configured by the UE with a structure of FIG. 9 or FIG. 10 as described in FIG. 12.

Then, the operations of the eNB may include transmitting a simultaneous transmission parameter for the simultaneous transmission between the uplink channels or between the uplink channels and the uplink signals (S1320). The simultaneous transmission parameter may include information indicating simultaneous transmission between the uplink channels or between the uplink channels and the uplink signals. For example, the simultaneous transmission parameter may be configured to independently have an RRC parameter from each cell group. A content related to the simultaneous transmission parameter will be described in detail according to each embodiment below.

Then, the eNB receives the uplink channels or the uplink signals from the UE as in step S1220 (S1330). The uplink channels or the uplink signals are transmitted by transmission power which the UE independently determines from a cell group including a serving cell related to a corresponding eNB.

Hereinafter, each embodiment of a multiplexing method and a transmission power control method for transmitting uplink channels or uplink signals in dual connectivity environment will be described in detail. That is, a multiplexing method for uplink channels and signals for a user equipment configured with different cell groups, a user equipment configured with dual connectivity, and a user equipment configured with multiple PUCCH configuration.

As described above, the UE may independently determine the maximum uplink transmission power from each cell group. Further, the UE may determine transmission power of the uplink channels and the uplink signals on the basis of a maximum uplink transmission power determined from each cell group.

When the transmission power of the uplink channels or the uplink signals is independently applied in each cell group as described above with Equation 1 to Equation 4, a method of independently having an RRC parameter may be provided in order to support multiplexing between uplink channels and signals transmitted from a user equipment configured with dual connectivity to cell groups with different types (e.g., the MCG and the SCG) or to different eNBs (e.g., the MeNB and the SeNB). That is, each cell group may have an independent RRC parameter among four kinds of parameters, which are configured to notify an event needed to be supported through an operation of the UE.

Method 1: a method of independently configuring an RRC parameter (e.g., an ackNackSRS-SimultaneousTransmission) capable of indicating simultaneous transmission of a PUCCH format capable of transmitting Ack/Nack through a PUCCH format 3 and a PUCCH format 1/1a/1b, and a SRS for each cell group.

For example, a RRC parameter may be configured to indicate simultaneous transmission of Ack/Nack and SRS for each cell group using a similar scheme ackNackSRS-SimultaneousTransmission for a master cell group and ack/NackSRS-SimultaneousTransmission for a secondary cell group. Furthermore, a RRC parameter may be configured to indicate simultaneous transmission of Ack/Nack and SRS for each eNB of each cell group using a similar scheme of ackNackSRS-SimultaneousTransmission for a master eNB and ackNackSRS-SimultaneousTransmission for a secondary eNB.

This is a method of configuring to perform multiplexing of the PUCCH and the SRS using a mechanism described with reference to Equation 1 to Equation 4 in a case where the simultaneous transmission of the Ack/Nack and the SRS can be performed in each cell group, because the PUCCH can be transmitted in one cell for each cell group. For example, one cell which can transmit the PUCCH for the each cell group may be a PCell in a MCG and may be a Scell (or a special PCell, sPCell, or a PSCell) in a SCG.

For another example, under the dual connectivity, a UE may be configured not to allow the simultaneous transmission of the PUCCH and the SRS in the SCG. In this event, it may be not necessary to use an ackNackSRS-SimultaneousTransmission for a corresponding SCG or a SeNB. However, an operation of the simultaneous transmission of the PUCCH and the SRS which transmit the ack/Nack according to a configuration of the ackNackSRS-SimultaneousTransmission should be applied to only the MCG or the MeNB. Therefore, with respect to the UE configuring the dual connectivity, it may need to change an ackNackSRS-SimultaneousTransmission into "ackNackSRS-SimultaneousTransmission for MCG" or "ackNackSRS-SimultaneousTransmission for MeNB" to be indicated. In addition, identical parameters may be used as it is. In this event, a base station may control a UE configured with dual connectivity to use a typical parameter (e.g., ackNackSRS-SimultaneousTransmission) only to MeNB or MCG.

Method 2: a method of independently configuring an RRC parameter: simultaneousAckNackAndCQI indicating to simultaneous transmission of ack/Nack and a CQI through a PUCCH 2/2a/2b for each cell group.

For example, an RRC parameter may be configured to indicate the simultaneous transmission of the Ack/Nack and the CQI for each cell group using a similar scheme of simultaneousAckNackAndCQI for a master cell group and simultaneousAckNackAndCQI for a secondary cell group. Further, an RRC parameter may be configured to indicate the simultaneous transmission of the Ack/Nack and the CQI for each eNB using a similar scheme of simultaneousAckNackAndCQI for a master eNB and simultaneousAckNackAndCQI for a secondary eNB.

This is a method of configuring to perform multiplexing of the Ack/Nack and the CQI using a mechanism described with reference to Equation 1 to Equation 4 in a case where the simultaneous transmission of the Ack/Nack and the CQI can be performed in each cell group, because the PUCCH can be transmitted in one cell for each cell group. For example, one cell which can transmit the PUCCH for the each cell group may be a PCell in a MCG and may be a Scell (or a special PCell, sPCell, or a PSCell) in a SCG.

For another example, under the dual connectivity, a UE may be configured not to allow the simultaneous transmission of the Ack/Nack and the CQI on the PUCCH in the SCG. In this event, it may not necessary of "simultaneousAckNackAndCQI for SCG (or SeNB)" for the simultaneous transmission of the Ack/Nack and the CQI of the PUCCH for a corresponding SCG. However, in this event, an operation of simultaneously transmitting the Ack/Nack and the CQI on the PUCCH according to a configuration of the simultaneousAckNackAndCQI should be applied to only the MCG or the MeNB. Therefore, with respect to the UE configuring the dual connectivity, it may need to change a simultaneousAckNackAndCQI into the "simultaneousAckNackAndCQI for MCG" or "simultaneousAckNackAndCQI for MeNB" to be indicated. Further, when using identical parameters, a base station may control the UE configuring the dual connectivity to use the simultaneousAckNackAndCQI (e.g., typical RRC parameter) only for the MeNB or the MCG.

Method 3: a method of independently configuring an RRC parameter: simultaneousAckNackAndCQI-Format3-r11 indicating simultaneous transmission of ack/Nack and a CQI through a PUCCH 3 for each cell group.

For example, an RRC parameter may be configured to indicate the simultaneous transmission of the Ack/Nack and the CQI for each cell group using a similar scheme of simultaneousAckNackAndCQI-Format3 for a master cell group and simultaneousAckNackAndCQI-Format3 for a secondary cell group. Furthermore, an RRC parameter may be configured to indicate the simultaneous transmission of the Ack/Nack and the CQI for each eNB using a similar scheme of a simultaneousAckNackAndCQI-Format3 for a master eNB and a simultaneousAckNackAndCQI-Format3 for a secondary eNB.

This is a method of configuring to perform multiplexing of the Ack/Nack and the CQI using a mechanism described with reference to Equation 1 to Equation 4 in a case where the simultaneous transmission of the Ack/Nack and the CQI can be performed in each cell group, because the PUCCH can be transmitted in one cell for each cell group. For example, one cell which can transmit the PUCCH for the each cell group may be a PCell in a MCG and may be a Scell (or a special PCell, sPCell, or a PSCell) in a SCG.

For another example, under the dual connectivity, a UE may be configured not to allow the simultaneous transmission of the Ack/Nack and the CQI on the PUCCH in the SCG. In this event, it is not necessary to have "simultaneousAckNackAndCQI-Format3 for SCG (or SeNB)" for the simultaneous transmission of the Ack/Nack and the CQI of the PUCCH for a corresponding SCG. However, in this event, an operation of simultaneously transmitting the Ack/Nack and the CQI on the PUCCH according to a configuration of the simultaneousAckNackAndCQI-Format3 should be applied to only the MCG or the MeNB. Therefore, with respect to the UE configuring the dual connectivity, it may need to change a simultaneousAckNackAndCQI-Format3-r11 which is a corresponding parameter into the "simultaneousAckNackAndCQI-Format3 for MCG" or "simultaneousAckNackAndCQI-Format3 for MeNB" to be indicated. Further, when using identical parameters, a base station (e.g., eNB) may control the UE configuring the dual connectivity to use simultaneousAckNackAndCQI-Format3-r11 (e.g., a typical RRC parameter) only for the MeNB or the MCG.

Method 4: a method of independently configuring an RRC parameter: simultaneous PUCCH-PUSCH, as an indication of enabling simultaneous transmission of a PUCCH and a PUSCH for each cell group.

For example, an RRC parameter may be configured to indicate the simultaneous transmission of the PUCCH and the PUSCH for each cell group using a similar scheme of simultaneous PUCCH-PUSCH for a master cell group and simultaneous PUCCH-PUSCH for a secondary cell group. Further, an RRC parameter may be configured to indicate the simultaneous transmission of the PUCCH and the PUSCH for each eNB configuring each cell group using a similar scheme of simultaneous PUCCH-PUSCH for a master eNB and simultaneous PUCCH-PUSCH for a secondary eNB.

This is a method of configuring that multiplexing of the PUCCH and the PUSCH and a piggyback mechanism of the PUSCH for an UCI to be transmitted to the PUCCH for a backward compatibility, using a mechanism described with reference to Equation 1 to Equation 4 in a case where the simultaneous transmission of the PUCCH and the PUSCH can be performed in each cell group, because the PUCCH can be transmitted in one cell for each cell group. One cell which can transmit the PUCCH for the each cell group may be a PCell in a MCG and may be a Scell (or a special PCell, sPCell, or a PSCell) in a SCG.

For another example, under the dual connectivity, a UE may be configured not to allow the simultaneous transmission of the PUCCH and the PUSCH in the SCG. In this event, it is not necessary to have simultaneous PUCCH-PUSCH for a corresponding SCG or a SeNB. However, an operation of the simultaneous transmission of the PUCCH and the PUSCH according to a configuration of the simultaneous PUCCH-PUSCH should be applied to only the MCG or the MeNB. Therefore, with respect to the UE configuring the dual connectivity, it may need to change simultaneous PUCCH-PUSCH which is a corresponding RRC parameter into the "simultaneous PUCCH-PUSCH for MCG" or "simultaneous PUCCH-PUSCH for MeNB" to be indicated. In addition, identical parameters may be used as it is. In this event, a base station (e.g., eNB) may control the UE configuring the dual connectivity to use the simultaneous PUCCH-PUSCH which is an existing RRC parameter only for the MeNB or the MCG.

As described above, the multiplexing method between the uplink channels or between the uplink channels and the uplink signals using independent RRC parameters for each cell group in the UE has been described.

Hereinafter, an operation of controlling transmission power of an uplink channel and an uplink signal for a UE configured with different cells, a UE supporting a dual connectivity, or a UE configured with multiple PUCCH will be described in accordance with at least one embodiment.

For example, the UE may configure a maximum uplink transmission power for each cell group. That is, a master cell group may configure an maximum uplink transmission power as P_cmax,MCG and a secondary cell group may configure an maximum uplink transmission power as P_cmax,SCG. The configured P_cmax,MCG and P_cmax,SCG may be satisfied with any one of following conditions.

1) $P_{CMAX} >= P_{CMAX,MCG}$, $P_{CMAX} >= P_{CMAX,SCG}$, $P_{CMAX} >= P_{CMX,MCG} + P_{CMAX,SCG}$

2) P_cmax>=P_cmax,MCG, P_cmax>=P_cmax,SCG, P_cmax<=P_cmax,MCG+P_cmax,SCG

The embodiments of the present disclosure may be applied to the above conditions 1) and 2). For convenience and ease of understanding, the embodiments will be described as being applied to the 1) condition. However, the embodiments of the present disclosure are not limited thereto. For example, the embodiments can be applied to the condition 2) as well.

As described above, in determining the uplink transmission power, the UE according to embodiments of the present disclosure may independently determine the uplink transmission power using a maximum uplink transmission power configured for each cell group. That is, the UE may replace and apply the P_cmax with the P_cmaz,MCG for the PUCCH/PUSCH/PRACH and the SRS transmission of serving cells which belong to the MCG, and may apply the P_cmax with the P_cmaz,SCG for the PUCCH/PUSCH/PRACH and the SRS transmission of serving cells which belong to the SCG.

For example, as described with reference to FIG. 10 to FIG. 13, the transmission power of the uplink signals and channels may be determined using the maximum uplink transmission power of each cell group. In particular, the determination of the transmission power of the uplink signals or the uplink channels may be described by changing $P_{CMX}$ to $P_{CMX,CG}$ in a section 5.1.1.1 of a typical technical specification (TS) 36.213 as shown in table below.

| Proposed Modification of section 5.1.1.1 in TS 36.213 v11.5.0 |
| --- |
| If the UE is configured with multiple TAGs, and if the PUCCH/PUSCH transmission of the UE on subframe i for a given serving cell in a TAG overlaps some portion of the first symbol of the PUSCH transmission on subframe i + 1 for a different serving cell in another TAG the UE shall adjust its total transmission power to not exceed $P_{CMAX,CG}$ on any overlapped portion. |
| If the UE is configured with multiple TAGs, and if the PUSCH transmission of the UE on subframe i for a given serving cell in a TAG overlaps some portion of the first symbol of the PUCCH transmission on subframe i + 1 for a different serving cell in another TAG the UE shall adjust its total transmission power to not exceed $P_{CMAX,CG}$ on any overlapped portion. |
| If the UE is configured with multiple TACs, and if the SRS transmission of the UE is a symbol on subframe i for a given serving cell in a TAG overlaps with the PUCCH/PUSCH transmission on subframe i or subframe i + 1 for a different serving cell in the same or another TAG the UE shall drop SRS if its total transmission power exceeds $P_{CMAX,CG}$ on any overlapped portion of the symbol. |
| If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i + 1 for another serving cell(s) the UE shall drop the SRS transmissions if the total transmission power exceeds $P_{CMAX,CG}$ on any overlapped portion of the symbol. |
| If the UE is configured with multiple TAGs, the UE shall, when requested by higher layers, to transmit PRACH in a secondary serving cell in parallel with SRS transmission, in a symbol on a subframe of a different serving cell belonging to a different TAG, drop SRS if the total transmission power exceeds $P_{CMAX,CG}$ on any overlapped portion in the symbol. |
| If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX,CG}$ on the overlapped portion. |
| where $P_{CMAX,CG}$ is P_cmax.CG for each cell group and CG is one of [MCG, SCG]. |

When the P_cmax,CG for uplink channels (PUCCH/PUSCH/PRACH) and signal (SRS) is determined by each cell group with respect to a UE configured with different cells, a UE configured with dual connectivity, or a UE configured with multiple PUCCH configurations, a backward compatibility can be maintained in controlling transmission power for each uplink channel, uplink channels, and the combination thereof. Further, in order to use a mechanism for power scaling related to power control used when a carrier aggregation is performed in one eNB, the power scaling is preferentially performed in identical cell groups. As a next step, the power scaling is performed when a sum of transmission powers of the uplink channels (PUCCH/PUSCH/PRACH) and signals (SRS) which are transmitted between different cell groups exceeds the P_cmax which is a maximum power of the UE.

FIG. 14 to FIG. 24 are diagrams illustrating methods for a UE to transmit an uplink signal or channel according to various embodiments of the present disclosure.

Referring to FIG. 14 to FIG. 24, a method of performing power scaling when a sum of transmission powers of uplink channels (PUCCH/PUSCH/PRACH) and signals (SRS) collectively transmitted between different cell groups exceeds the P_cmax (e.g., a maximum power of the UE) will be described in accordance with at least one embodiment of the present disclosure.

For example, following methods may be applied for performing multiplexing and power control according to transmission of multiple PUCCH(s)/PUSCH/SRS (e.g., uplink channels/signal combination) transmitted from different cell groups by a UE configured with different cell groups.

When these methods are applied, the following additional operations of the UE are required with respect to the combination of uplink channels and signals which are transmitted to a MCG and a SCG, respectively.

When PUCCHs are simultaneously transmitted to different cell groups, and when a maximum transmission power $P_{CMAX}$ of UE is exceeded.

Figure 14:
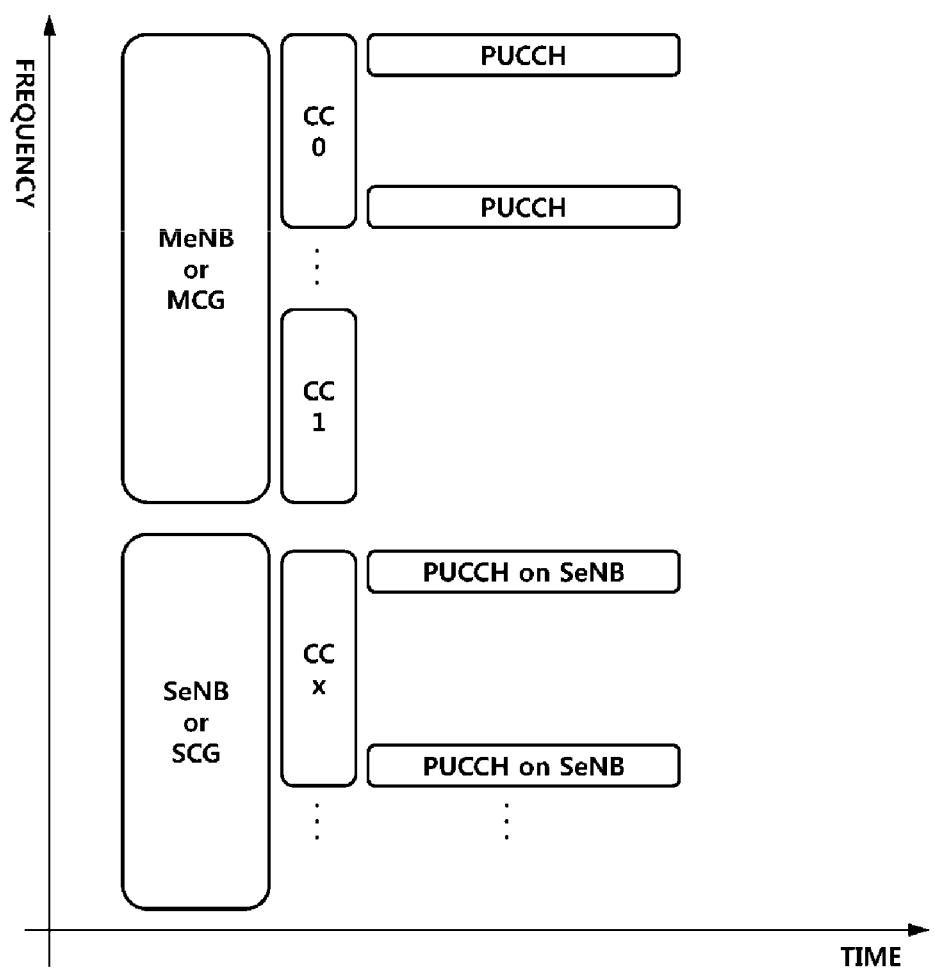
FIG. 14 to FIG. 24 are diagrams illustrating methods for a UE to transmit an uplink signal or channel according to embodiments of the present disclosure.

As shown in FIG. 14, if the UE is configured with dual connectivity capability or multiple PUCCH configuration, and if the PUCCH transmission of the UE on sub-frame i for a given serving cell on a Master Cell Group (MCG) overlaps some portion of the PUCCH transmission on sub-frame i+1 for a serving cell on a Secondary Cell Group (SCG), the UE should adjust any overlapped portion not to exceed $P_{CMAX}$ which is its total maximum transmission power.

When PUCCH/PUSCH are simultaneously transmitted to different cell groups, and when a maximum transmission power $P_{CMAX}$ of a UE is exceeded.

Figure 15:
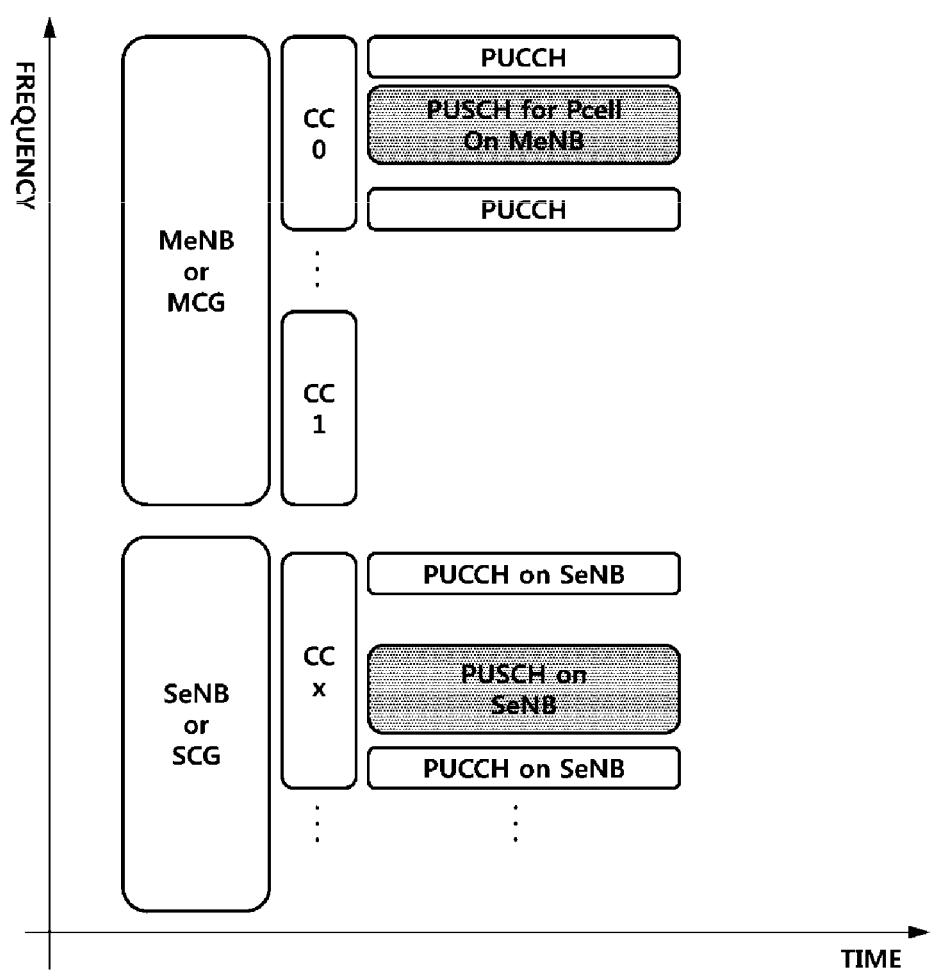

As shown in FIG. 15, if the UE is configured with dual connectivity capability and multiple PUCCH configuration, and if the PUCCH transmission of the UE on sub-frame i for a serving cell on a Master Cell Group (MCG) overlaps some portion of the PUCCH transmission on sub-frame i+1 for a serving cell on a Secondary Cell Group (SCG), the UE should adjust any overlapped portion not to exceed $P_{CMAX}$ which is its total maximum transmission power.

Figure 16:
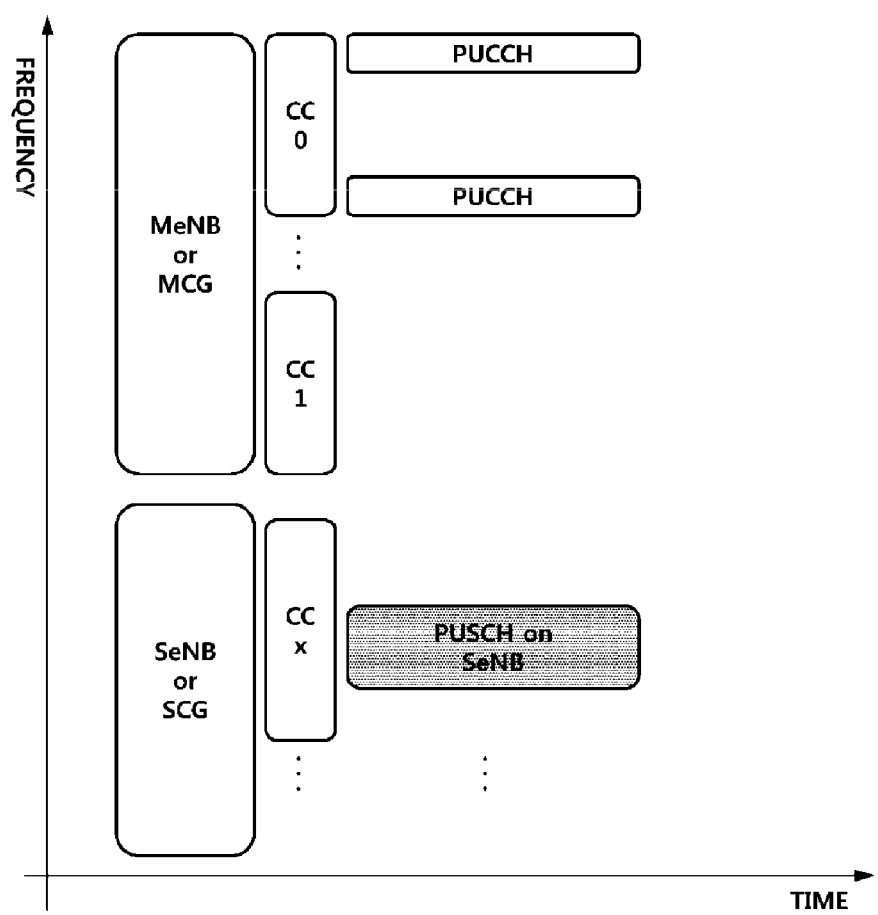

When "PUCCH on MCG" is transmitted under a configuration of different cell groups and "PUSCH on SCG" is simultaneously transmitted to different cell groups, and when a maximum transmission power $P_{CMAX}$ of a UE is exceeded As shown in FIG. 16, if the UE is configured with dual connectivity capability and multiple PUCCH configuration, and if the PUCCH transmission of the UE on sub-frame i for a serving cell on a Master Cell Group (MCG) overlaps some portion of the first symbol of the PUCCH transmission on sub-frame i+1 for a serving cell on a Secondary Cell Group (SCG), the UE should adjust any overlapped portion not to exceed $P_{CMAX}$ which is its total maximum transmission power.

When "PUCCH on MCG" is transmitted under a configuration of different cell groups and "PUSCH on SCG" is simultaneously transmitted to different cell groups, and when a maximum transmission power $P_{CMAX}$ of a UE is exceeded.

Figure 17:
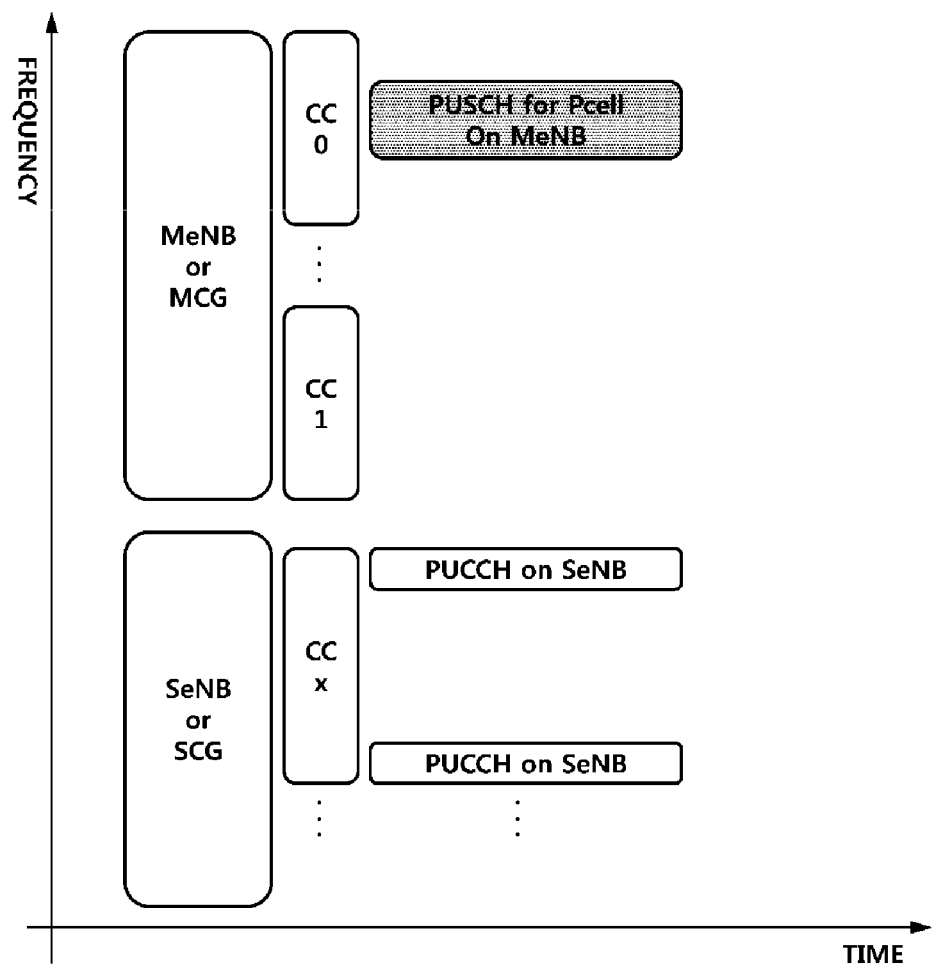

As shown in FIG. 17, if the UE is configured with dual connectivity capability and multiple PUCCH configuration, and if the PUCCH transmission of the UE on sub-frame i for a serving cell on a Master Cell Group (MCG) overlaps some portion of the first symbol of the PUCCH transmission on sub-frame i+1 for a serving cell on a Secondary Cell Group (SCG), the UE should adjust any overlapped portion not to exceed $P_{CMAX}$ which is its total maximum transmission power.

When "SRS on MCG" is transmitted in one cell group under a configuration of different cell groups and "PUCCH/PUSCH on SCG" is simultaneously transmitted to different cell groups, and when a maximum transmission power $P_{CMAX}$ of a UE is exceeded.

Figure 18:
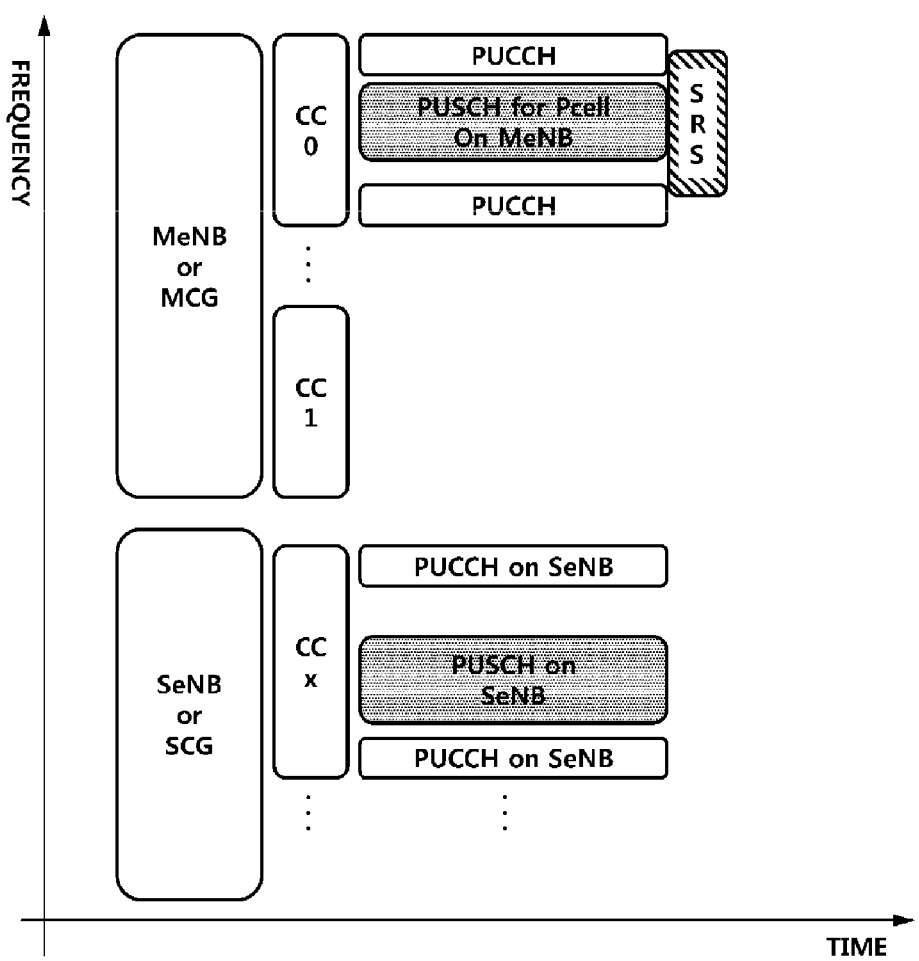
Figure 19:
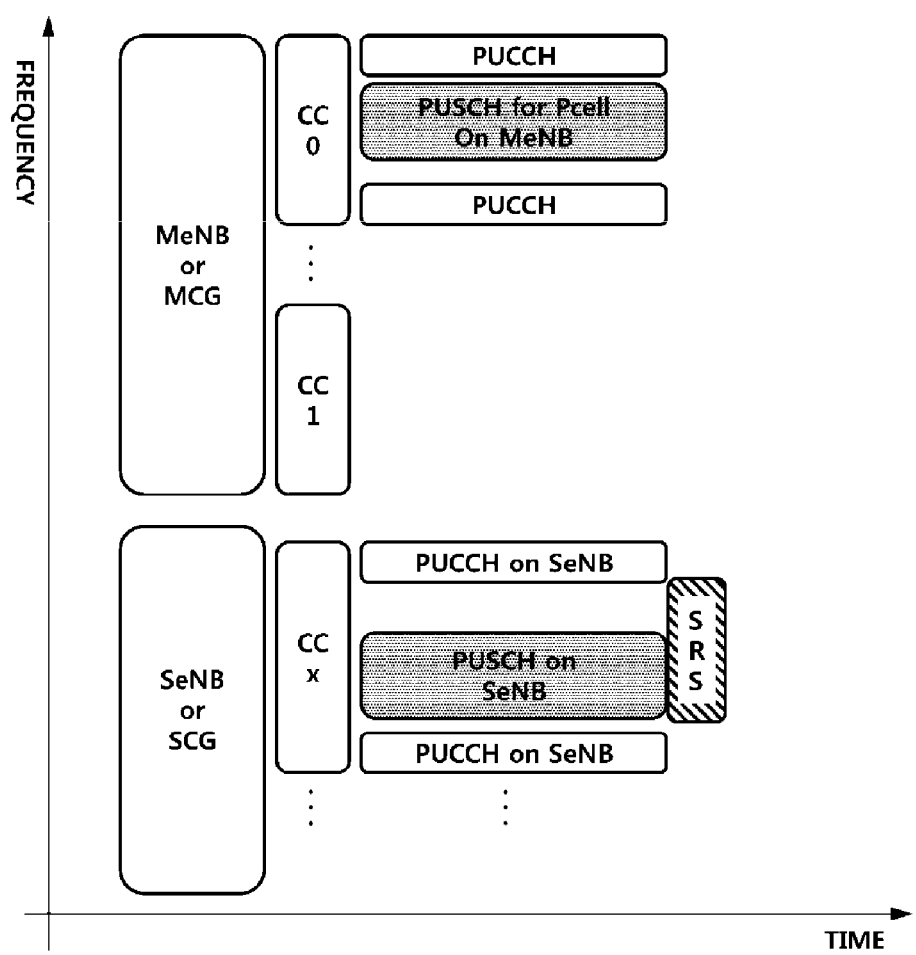

FIG. 18 is a diagram for describing operation when a SRS is transmitted from a MCG and FIG. 19 is a diagram for describing operation when a SRS is transmitted from a SCG.

As shown in FIG. 18 and FIG. 19, if the UE is configured with dual connectivity capability and multiple PUCCH configuration, and if the SRS transmission of the UE in a symbol on sub-frame i for a serving cell on one cell group overlaps with some of the PUCCH/PUSCH transmission on sub-frame i or sub-frame i+1 for a different serving cell on another cell group, the UE drops SRS not to exceed its total transmission power on any overlapped portion of the symbol.

When a PRACH is transmitted on one cell group under a configuration of different cell groups and SRS is simultaneously transmitted in a cell belonging to different cell groups, and when a maximum transmission power $P_{CMAX}$ of a UE is exceeded.

Figure 20:
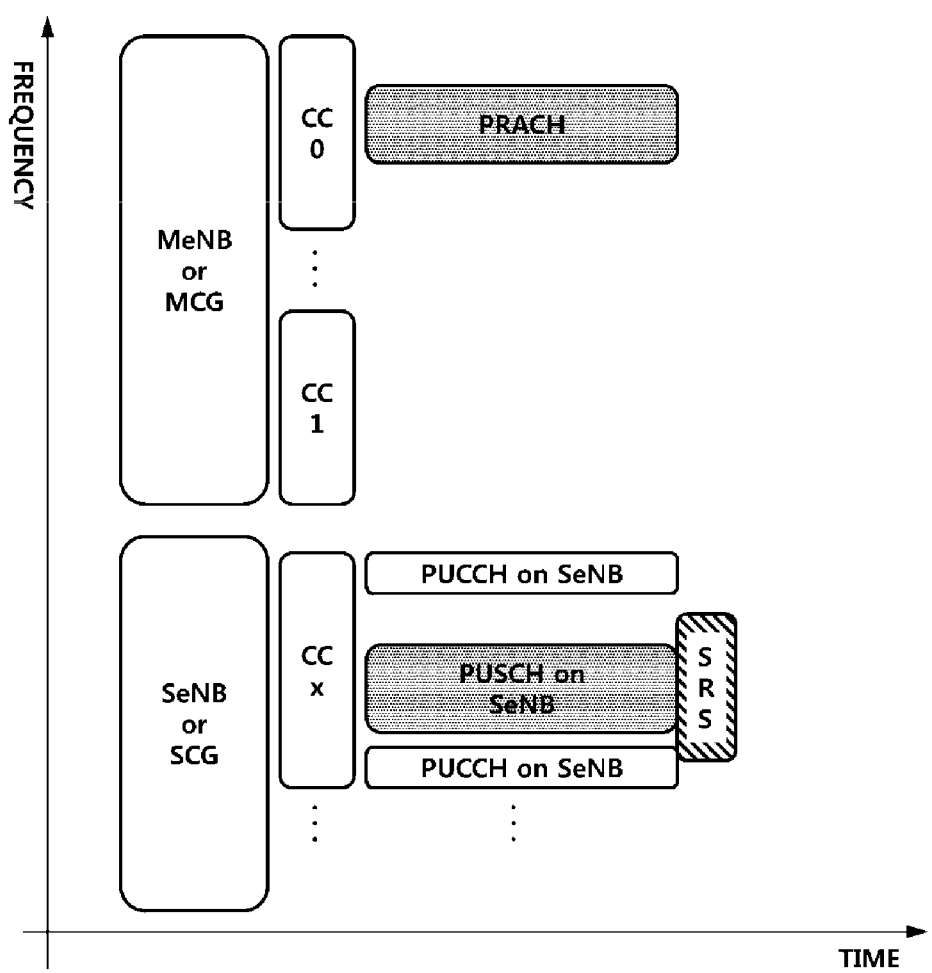
Figure 21:
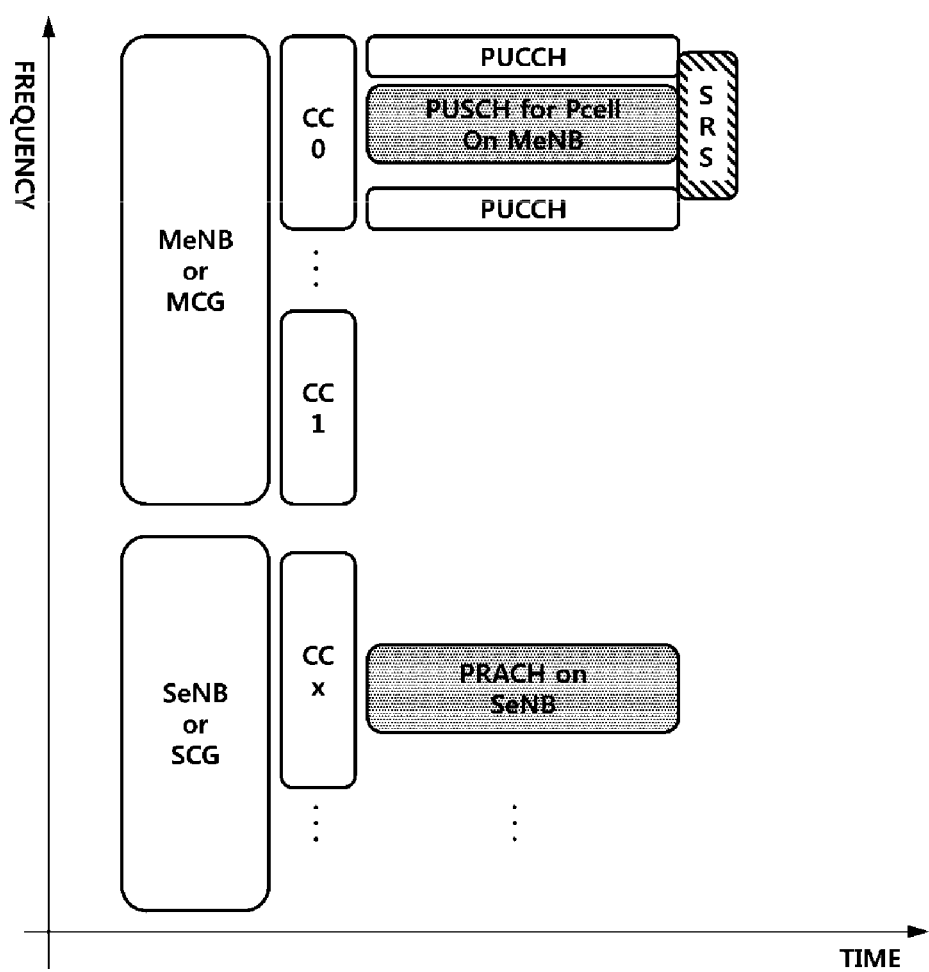

FIG. 20 is a diagram for described operation when a PRACH is transmitted in a MCG and a SRS is transmitted in a SCG and FIG. 21 is a diagram for describing operation when a PRACH is transmitted in a SCG and a SRS is transmitted in a MCG.

As shown in FIG. 20 and FIG. 21, if the UE is configured with dual connectivity capability and multiple PUCCH configuration, if PRACH is transmitted in response to a request from a higher layer in more than a serving cell on one cell group with SRS transmission in a symbol on a sub-frame of more than a different serving cell belonging to a different cell group, the UE drops SRS if it's the total maximum transmission power exceeds PCMAX on any overlapped in the symbol.

When PRACH is transmitted from more than one cell of one cell group under a configuration of different cell groups and PUSCH/PUCCH are simultaneously transmitted from a cell(s) belonging to different cell groups, and when a maximum transmission power $P_{CMAX}$ of a UE is exceeded.

As shown in FIG. 20 and FIG. 21, if the UE is configured with dual connectivity capability and multiple PUCCH configuration, the UE controls transmission power of PUSCH/PUCCH not to exceed total maximum transmission power $P_{CMAX}$ of the UE on the overlapped portion when PRACH is transmitted in one or more serving cells on one cell group and when the PUSCH/PUCCH transmission is performed in a symbol on a sub-frame of one or more serving cells on a different cell group in response to a request from a higher layer.

Figure 22:
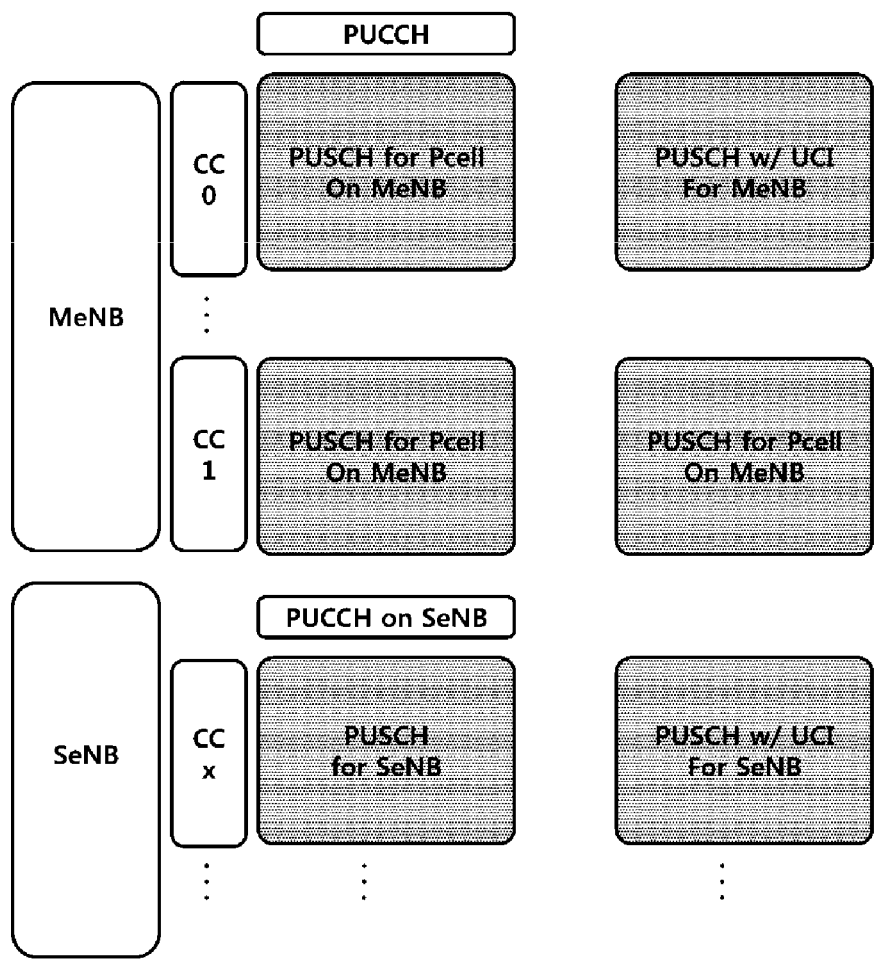
Figure 23:
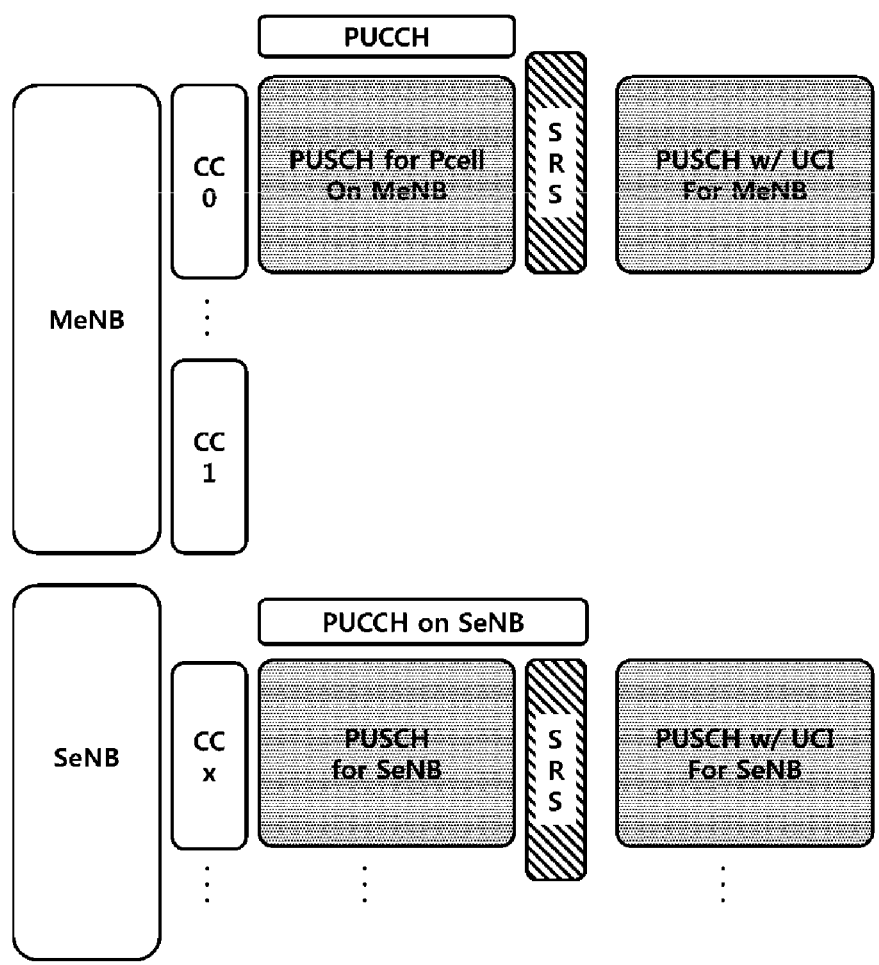
Figure 24:
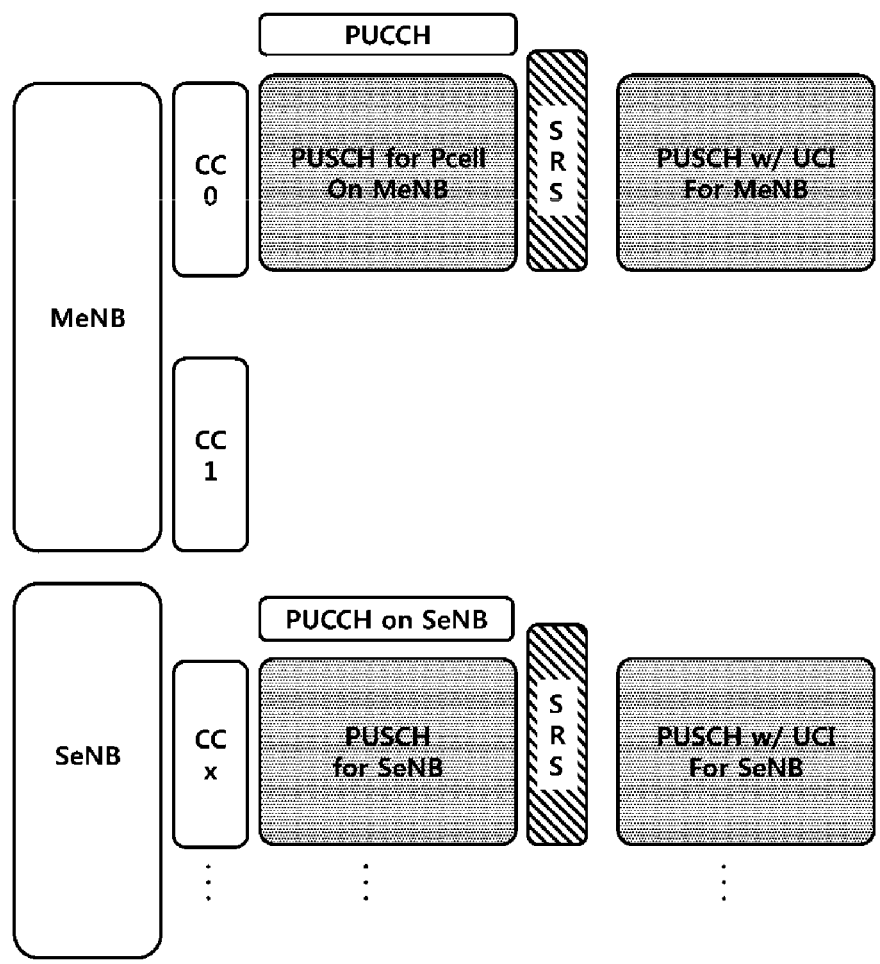

As shown in FIG. 22 to FIG. 24, in the dual connectivity, the UE may transmit a PUCCH, a PUSCH, and a SRS in a serving cell of different cell groups. Herein, a method of allocating transmission power of the present disclosure with reference to FIG. 14 to FIG. 21 may be applied to.

Referring to FIG. 22, the PUCCH may be transmitted in one cell of a MCG and the PUCCH may be transmitted in one cell of a SCG. Further, the PUSCH may be transmitted in each serving cell configuring the MCG and SCG. Herein, some PUSCH may not include an UCI.

Even in a case of FIG. 23, the PUCCH may be transmitted in one cell of a MCG and the PUCCH may be transmitted in one cell of a SCG. Further, the SRS and the PUSCH may be transmitted in a serving cell of each cell group where the PUCCH is transmitted and some PUSCH may not include an UCI. Herein, the SRS of the MCG may be overlapped with the PUCCH of the SCG.

In a case of FIG. 24, the PUCCH may be transmitted in one cell of a MCG and the PUCCH may be transmitted in one cell of a SCG. Further, the SRS and the PUSCH may be transmitted in a serving cell of each cell group where the PUCCH is transmitted and some PUSCH may not include an UCI. Herein, the SRS of the MCG may not be overlapped with the PUCCH of the SCG.

As described above, the present disclosure provides specific methods of controlling uplink transmission power when a UE transmits uplink channels and signals in a dual connectivity environment. Further, the present disclosure provides a method and an apparatus for allocating a transmission power for each signal when a UE simultaneously transmits an uplink channel and signal in a dual connectivity environment. Further, the present disclosure provides a method and an apparatus for performing simultaneous transmission of uplink channels and signals according to independent transmission indicator configuration for each cell group for a simultaneous transmission of channels and signals transmitted to each cell group when a UE simultaneously transmits an uplink channel and signal in a dual connectivity environment.

In other words, when carrier aggregation (e.g., inter-eNB carrier aggregation and dual connectivity support) between base stations (e.g., eNBs) having different types is performed or when carrier aggregation is performed using a carrier having identical or different TDD and FDD duplex modes, an operation of a UE according to a configuration of a PCell and a SCell between a UE and different eNBs and an ambiguity between a UE and an eNB can be solved. Therefore, an access procedure which is performed between the UE and the eNB, an uplink data transmission and an uplink signal transmission, and a transmission and reception operation of an uplink control channel including an HARQ operation are precisely performed, thereby securing a reliability for a data transmission between the UE and different eNBs, and of the UE under different eNBs and different duplex modes. Through this, a data transmission rate of an uplink and a downlink can increase.

Figure 25:
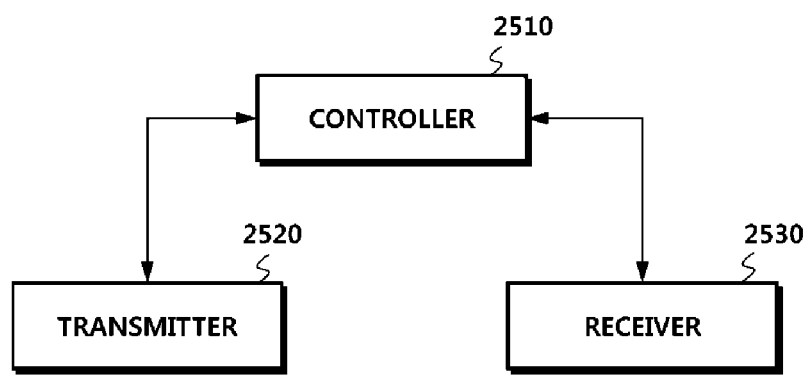
FIG. 25 is a diagram illustrating a configuration of a user equipment according to embodiments of the present disclosure.

FIG. 25 is a diagram illustrating a configuration of a user equipment according to embodiments of the present disclosure.

Referring to FIG. 25, a user equipment (UE) 2500, according to embodiments of the present disclosure, includes a receiver 2530, a controller 2510, and a transmitter 2520.

The controller 2510 may determine a maximum uplink transmission power for each of multiple cell groups including one or more serving cells and the transmitter 2520 may transmit uplink channels and uplink signals of each of the multiple cell groups using the maximum uplink transmission power of the each of the multiple cell groups.

Further, the controller 2510 may determine a sum of maximum uplink transmission powers with respect to each cell group of the multiple cell groups to be less than or equal to its a total maximum transmission power. Also, in determining transmission power for simultaneous transmission between the uplink channels or between the uplink channels and the uplink signals, the controller 2510 may independently determine the transmission power for each of multiple cell groups using a maximum uplink transmission power for each of the multiple cell groups.

For example, the transmission power for the simultaneous transmission between the uplink channels may include transmission power for simultaneous transmission between a Physical Uplink Control Channel (PUCCH) and a Physical Uplink Shared Channel (PUSCH). For another example, the transmission power for the simultaneous transmission between the uplink channels and the uplink signals may include transmission power for simultaneous transmission between a Physical Uplink Control Channel (PUCCH)/Physical Uplink Shared Channel (PUSCH) and a Sounding Reference Signal (SRS). Further still another example, the transmission power for a transmission of the uplink channels and the uplink signals may be preferentially determined from each of the multiple cell group and then be mutually determined between the multiple cell groups.

In addition, the controller 2510 controls general operations of the UE as the UE multiplexes the uplink channels and the uplink signals in serving cells under identical eNBs or between serving cells of different eNBs in a dual connectivity environment.

The transmitter 2520 may transmit the uplink channels and the uplink signals using transmission power for simultaneous transmission. Further, the transmitter 2520 transmits uplink control information, uplink data, and messages through a corresponding channel.

The receiver 2530 may receive, from the eNB, downlink control information, downlink data, a message, through a corresponding channel.

Figure 26:
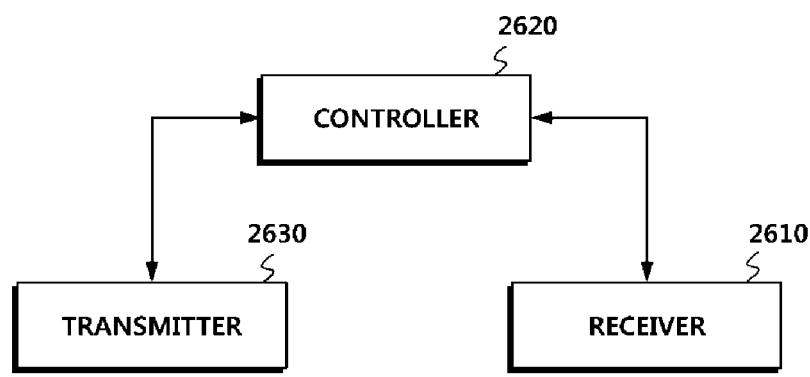
FIG. 26 is a diagram illustrating a configuration of an eNB according to embodiments of the present disclosure.

FIG. 26 is a diagram illustrating a configuration of a base station (e.g., eNB) according to embodiments of the present disclosure.

Referring to FIG. 26, an eNB 2600 according to embodiments of the present disclosure includes a controller 2620, a transmitter 2630, and a receiver 2610.

The controller 2620 configures dual connectivity in a UE and the receiver 2610 receives uplink channels and uplink signals from the eNB. Herein, the uplink channels and the uplink signals may be transmitted on the basis of a maximum uplink transmission power for a cell group including one or more cell provided by the eNB. Further, the uplink channels and the uplink signals may be received from one sub-frame and may be transmitted on the basis of a transmission power, which is independently determined in a cell group, for simultaneous transmission between the uplink channels or between the uplink channels and the uplink signals. Further, the transmission power for the simultaneous transmission between the uplink channels may include transmission power for simultaneous transmission between the PUCCH and the PUSCH and the transmission power for the simultaneous transmission between the uplink channels and the uplink signals may include transmission power for simultaneous transmission between the PUCCH/PUSCH and the SRS.

In addition, the controller 2620 controls general operations of the UE as the UE multiplexes the uplink channels and the uplink signals in serving cells under identical eNBs or between serving cells of different eNBs in a dual connectivity environment.

The transmitter 2630 may transmit a simultaneous transmission parameter for simultaneous transmission between the uplink channels or between the uplink channels and the uplink signals.

In addition, the transmitter 2630 and the receiver 2610 may be used for transmitting and receiving a signal or a message and data required for performing the above described present invention, to/from a terminal.

Although the embodiments of the present disclosure have been described for illustrative purposes, those skilled in the art will appreciate that various modifications, additions and substitutions are possible, without departing from the scope and spirit of the invention. Accordingly, the embodiments disclosed in the present disclosure are merely to not limit but describe the technical spirit of the present disclosure. Further, the scope of the technical spirit of the present disclosure is not limited by the embodiments. The scope of the present disclosure shall be construed on the basis of the accompanying claims in such a manner that all of the technical ideas included within the scope equivalent to the claims belong to the present invention.

What is claimed is:

1. A method of controlling uplink transmission power by a User Equipment (UE), the method comprising:

determining cell group (CG) maximum uplink transmission powers to be individually applied to each one of multiple cell groups, wherein each one of the multiple cell groups includes a plurality of serving cells associated with a corresponding base station;

performing an uplink transmission power determination based on the CG maximum uplink transmission power of each one of the multiple cell groups; and transmitting uplink channels and uplink signals for each one of the multiple cell groups using transmission power determined through the uplink transmission power determination, wherein the determining includes:

determining the CG maximum uplink transmission power for each one of the multiple cell groups such that a sum of CG maximum uplink transmission powers for each one of the multiple cell groups is less than or equal to a total maximum transmission power of the UE;

wherein the performing includes:

in the case that simultaneous transmission between the uplink channels or between the uplink channels and the uplink signals is performed through different serving cells belonging to a same cell group or different cell groups, independently determining transmission power for the simultaneous transmission in each one of the multiple cell groups, based on the CG maximum uplink transmission power of each one of the multiple cell groups;

wherein at least one of the multiple cell groups is configured as a specific radio bearer for a first service, and as a specific bearer for a second service, wherein the first service is different from the second service; and wherein the transmission power for the transmission of the uplink channels and the uplink signals is determined in each one of the multiple cell groups after each of the CG maximum uplink transmission powers for each one of the multiple cell groups is preferentially determined.

2. The method of claim 1, wherein:

the transmitting of the uplink channels and the uplink signals comprises transmitting the uplink channels and the uplink signals using the transmission power determined for the simultaneous transmission.

3. The method of claim 2, wherein:

the transmission power for the simultaneous transmission between the uplink channels comprises transmission power for simultaneous transmission between a Physical Uplink Control Channel (PUCCH) and a Physical Uplink Shared Channel (PUSCH); and the transmission power for the simultaneous transmission between the uplink channels and the uplink signals comprises transmission power for simultaneous transmission between the PUCCH or PUSCH and a Sounding Reference Signal (SRS).

4. The method claim 1, wherein the first service and the second service is one of a voice service, an internet service, and a data service.

5. The method of claim 1, wherein in a case that the multiple cell groups comprise a first cell group including a plurality of cells and a second cell group including a plurality of cells,
the determining the CG maximum uplink transmission powers includes:
determining a first CG maximum uplink transmission power for the first cell group; and
determining a second CG maximum uplink transmission power for the second cell group, wherein a sum of the first CG maximum uplink transmission power and the second CG maximum uplink transmission power does not exceed the total maximum transmission power of the UE; and
the performing the uplink transmission power determination includes:
performing a first transmission power determination for a first uplink transmission to be performed through at least one cell in the first cell group, based on the first CG maximum uplink transmission power determined for the first cell group; and
performing a second transmission power determination for a second uplink transmission to be performed through at least one cell in the second cell group, based on the second CG maximum uplink transmission power determined for the second cell group, wherein the first transmission power determination and the second transmission power determination are independently performed.

6. A method of receiving uplink channels and uplink signals by a base station, the method comprising:
configuring dual connectivity for a User Equipment (UE); and
receiving uplink channels and uplink signals from the UE,
wherein the uplink channels and the uplink signals are, by the UE, transmitted based on a cell group (CG) maximum uplink transmission power individually determined for a corresponding cell group including a plurality of cells associated with the base station;
wherein the CG maximum uplink transmission power for the corresponding cell group is determined such that a sum of CG maximum uplink transmission powers for the corresponding cell group and at least one associated cell group is less than or equal to a total maximum transmission power of the UE;
wherein in the case that simultaneous transmission between the uplink channels or between the uplink channels and the uplink signals is performed through different serving cells belonging to a same cell group or different cell groups,
transmission power for the simultaneous transmission is independently determined in the corresponding cell group, based on the CG maximum uplink transmission power for the corresponding cell group;
wherein at least one of the multiple cell groups is configured as a specific radio bearer for a first service, and as a specific bearer for a second service, wherein the first service is different from the second service; and wherein the transmission power for the transmission of the uplink channels and the uplink signals is determined in each one of the multiple cell groups after each of CG maximum uplink transmission powers for each one of the multiple cell groups is preferentially determined.

7. The method of claim 6, wherein:
the uplink channels and the uplink signals are received in one sub-frame; and
the uplink channels and the uplink signals are transmitted based on the transmission power determined for the simultaneous transmission.

8. The method of claim 7, wherein:
the transmission power for the simultaneous transmission between the uplink channels comprises transmission power for simultaneous transmission between a Physical Uplink Control Channel (PUCCH) and a Physical Uplink Shared Channel (PUSCH); and
the transmission power for the simultaneous transmission between the uplink channels and the uplink signals comprises transmission power for simultaneous transmission between the PUCCH or PUSCH and a Sounding Reference Signal (SRS).

9. The method of claim 6, further comprising:
transmitting a simultaneous transmission parameter for the simultaneous transmission between the uplink channels or between the uplink channels and the uplink signals.

10. The method of claim 6, wherein in a case that the multiple cell groups comprise a first cell group including a plurality of cells and a second cell group including a plurality of cells,
the determination of each of the CG maximum uplink transmission power includes:
determining a first CG maximum uplink transmission power for the first cell group; and
determining a second CG maximum uplink transmission power for the second cell group, wherein a sum of the first CG maximum uplink transmission power and the second CG maximum uplink transmission power does not exceed the total maximum transmission power of the UE; and
the determination of the transmission power for the transmission of the uplink channels and the uplink signals includes:
performing a first transmission power determination for a first uplink transmission to be performed through at least one cell in the first cell group, based on the first CG maximum uplink transmission power determined for the first cell group; and
performing a second transmission power determination for a second uplink transmission to be performed through at least one cell in the second cell group, based on the second CG maximum uplink transmission power determined for the second cell group, wherein the first transmission power determination and the second transmission power determination are independently performed.

11. A User Equipment (UE) for controlling an uplink transmission power, the UE comprising:
a controller configured to (i) determine cell group (CG) maximum uplink transmission powers to be individually applied to each one of multiple cell groups each including a plurality of serving cells associated with a corresponding base station and (ii) perform an uplink transmission power determination based on the CG maximum uplink transmission power of each one of the multiple cell groups; and a transmitter configured to transmit uplink channels and uplink signals for each one of the multiple cell groups using transmission power determined through the uplink transmission power determination, wherein the controller is configured to determine the CG maximum uplink transmission power for each one of the multiple cell groups such that a sum of CG maximum uplink transmission powers for each one of the multiple cell groups is less than or equal to a total maximum transmission power of the UE;

wherein the controller is configured to:

in the case that simultaneous transmission between the uplink channels or between the uplink channels and the uplink signals is performed through different serving cells belonging to a same cell group or different cell groups, independently determine transmission power for the simultaneous transmission in each one of the multiple cell groups, based on the CG maximum uplink transmission power of each one of the multiple cell groups;

wherein at least one of the multiple cell groups is configured as a specific radio bearer for a first service, and as a specific bearer for a second service, wherein the first service is different from the second service; and wherein the transmission power for the transmission of the uplink channels and the uplink signals is determined in each one of the multiple cell groups after each of the CG maximum uplink transmission powers for each one of the multiple cell groups is preferentially determined.

12. The UE of claim 11, wherein the transmitter is configured to transmit the uplink channels and the uplink signals using the transmission power determined for the simultaneous transmission.

13. The UE of claim 12, wherein:

the transmission power for the simultaneous transmission between the uplink channels comprises transmission power for simultaneous transmission between a Physical Uplink Control Channel (PUCCH) and a Physical Uplink Shared Channel (PUSCH); and the transmission power for the simultaneous transmission between the uplink channels and the uplink signals comprises transmission power for simultaneous transmission between the PUCCH or PUSCH and a Sounding Reference Signal (SRS).

14. The method claim 6, wherein the first service and the second service is one of a voice service, an internet service, and a data service.

15. The UE of claim 11, wherein the first service and the second service is one of a voice service, an internet service, and a data service.

16. The UE of claim 11, wherein in a case that the multiple cell groups comprise a first cell group including a plurality of cells and a second cell group including a plurality of cells, the determining of the CG maximum uplink transmission powers includes:

determining a first CG maximum uplink transmission power for the first cell group; and determining a second CG maximum uplink transmission power for the second cell group, wherein a sum of the first CG maximum uplink transmission power and the second CG maximum uplink transmission power does not exceed the total maximum transmission power of the UE; and the performing of the uplink transmission power determination includes:

performing a first transmission power determination for a first uplink transmission to be performed through at least one cell in the first cell group, based on the first CG maximum uplink transmission power determined for the first cell group; and performing a second transmission power determination for a second uplink transmission to be performed through at least one cell in the second cell group, based on the second CG maximum uplink transmission power determined for the second cell group, wherein the first transmission power determination and the second transmission power determination are independently performed.

* * * * *